United States Patent
Ishihara

(10) Patent No.: US 11,928,324 B2
(45) Date of Patent: Mar. 12, 2024

(54) COLORIMETRIC SYSTEM, COLORIMETRIC METHOD, AND NON-TRANSITORY COMPUTER-READABLE STORAGE MEDIUM STORING PROGRAM

(71) Applicant: SEIKO EPSON CORPORATION, Tokyo (JP)

(72) Inventor: Masami Ishihara, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 15 days.

(21) Appl. No.: 17/804,497

(22) Filed: May 27, 2022

(65) Prior Publication Data

US 2022/0382444 A1 Dec. 1, 2022

(30) Foreign Application Priority Data

May 28, 2021 (JP) ................. 2021-090110

(51) Int. Cl.
  *G06F 3/04847* (2022.01)
  *G01J 3/46* (2006.01)
  *G06F 3/0482* (2013.01)

(52) U.S. Cl.
  CPC .......... *G06F 3/04847* (2013.01); *G01J 3/462* (2013.01); *G06F 3/0482* (2013.01)

(58) Field of Classification Search
  CPC ............................................... G06F 3/048–05
  See application file for complete search history.

(56) References Cited

U.S. PATENT DOCUMENTS

| | | | | |
|---|---|---|---|---|
| 7,194,374 B2 * | 3/2007 | Kobayashi | .............. | G06F 9/453 715/705 |
| 2006/0109458 A1 * | 5/2006 | Watanabe | ................ | G01J 3/50 356/243.4 |
| 2007/0140539 A1 * | 6/2007 | Katsumata | ........... | A61B 1/0638 382/128 |
| 2007/0140553 A1 * | 6/2007 | Katsumata | .............. | G01J 3/462 382/162 |
| 2014/0232923 A1 * | 8/2014 | Koh | ...................... | G01J 3/0264 345/589 |
| 2022/0084659 A1 * | 3/2022 | Rowe | ..................... | G06V 10/56 |

FOREIGN PATENT DOCUMENTS

JP    2011-141253    7/2011

\* cited by examiner

*Primary Examiner* — Daniel Rodriguez
(74) *Attorney, Agent, or Firm* — WORKMAN NYDEGGER

(57) ABSTRACT

A colorimetric system includes an acquiring unit that acquires a colorimetric value obtained by performing colorimetry by a colorimetric unit, a display processing unit that performs a process of displaying a comparison graphic obtained by combining a reference color graphic of a reference color region with a sample color graphic of a sample color region, and a comparison processing unit that compares a color value of a reference color set in the reference color region with a color value of a sample color set in the sample color region.

9 Claims, 14 Drawing Sheets

FIG. 5
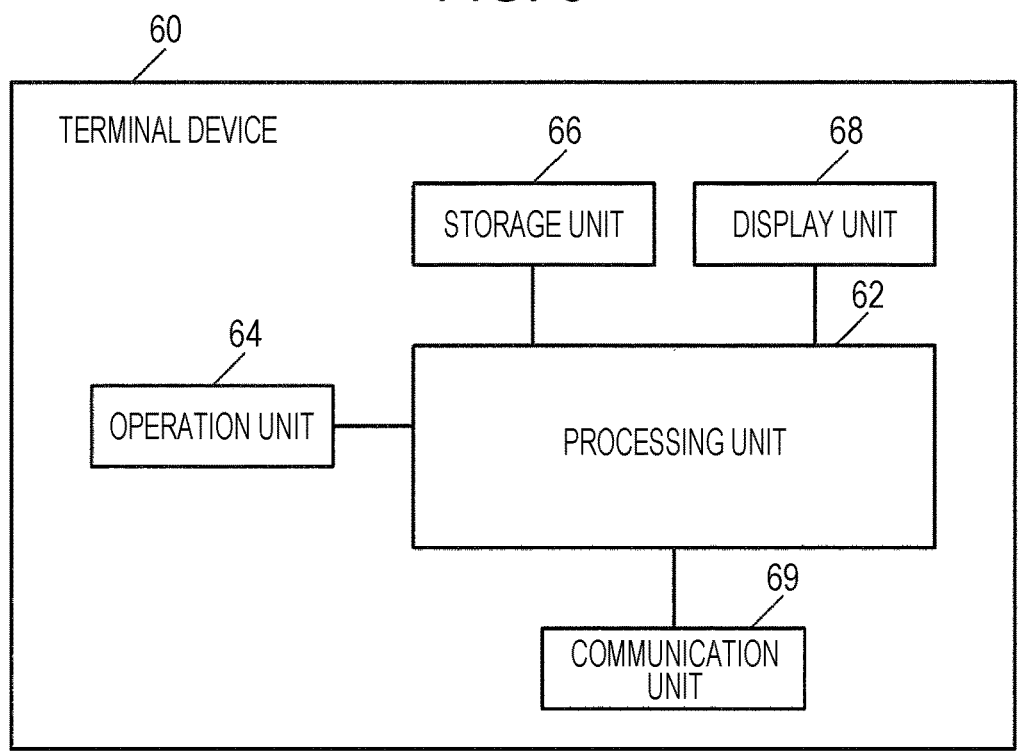
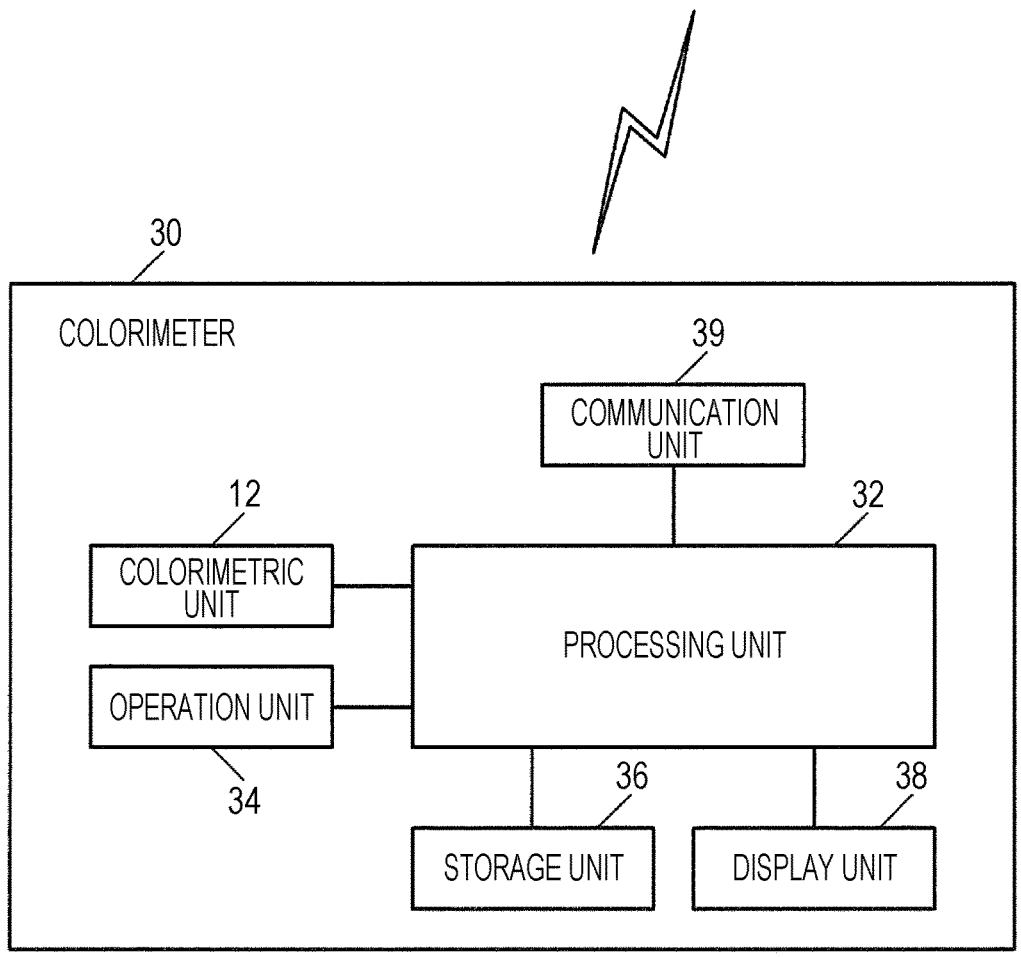

(SELECT SECOND BUTTON ICON)

FIG. 8
| STATE OF REFERENCE COLOR | COLORIMETRY | | | |
|---|---|---|---|---|
| | FIRST TIME | SECOND TIME | THIRD TIME | FOURTH TIME |
| LOCKED STATE 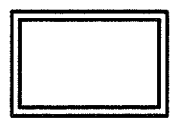 | ▭ CM1 | ▭ CM1<br>◯ CM2 | ▭ CM1<br>CM2<br>◯ CM3 | ▭ CM1<br>CM2<br>CM3<br>◯ CM4 |
| UNLOCKED STATE 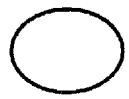 | ▭ CM1 | ▭ CM1<br>◯ CM2 | CM1<br>▭ CM2<br>◯ CM3 | CM1<br>CM2<br>▭ CM3<br>◯ CM4 |
▭ SET IN REFERENCE COLOR REGION
◯ SET IN SAMPLE COLOR REGION though the present disclosure described in the claims. In addition, not all configurations described in the embodiment are necessarily essential as solutions provided by the present disclosure.

COLORIMETRIC SYSTEM, COLORIMETRIC METHOD, AND NON-TRANSITORY COMPUTER-READABLE STORAGE MEDIUM STORING PROGRAM

The present application is based on, and claims priority from JP Application Serial Number 2021-090110, filed May 28, 2021, the disclosure of which is hereby incorporated by reference herein in its entirety.

BACKGROUND

1. Technical Field

The present disclosure relates to a colorimetric system, a colorimetric method, and a non-transitory computer-readable storage medium storing a program.

2. Related Art

A colorimetric system that performs colorimetry is known. JP-A-2011-141253 discloses a technique for comparing a reference color based on a reference value set in advance with a sample color subjected to colorimetry for a user.

For the colorimetric system, there are various use cases other than the use cases described in JP-A-2011-141253, and a user interface appropriate to support the various use cases has been requested. However, such circumstances are not taken into consideration for the technique described in JP-A-2011-141253.

SUMMARY

According to an aspect of the present disclosure, a colorimetric system includes an acquiring unit that acquires a colorimetric value obtained by performing colorimetry by a colorimetric unit; a display processing unit that performs a display process of displaying a comparison graphic obtained by combining a reference color graphic of a reference color region with a sample color graphic of a sample color region; and a comparison processing unit that compares a color value of a reference color set in the reference color region with a color value of a sample color set in the sample color region.

According to another aspect of the present disclosure, a colorimetric method includes acquiring a colorimetric value obtained by performing colorimetry by a colorimetric unit; performing a display process of displaying a comparison graphic obtained by combining a reference color graphic of a reference color region with a sample color graphic of a sample color region; and comparing a color value of a reference color set in the reference color region with a color value of a sample color set in the sample color region.

According to still another aspect of the present disclosure, a non-transitory computer-readable storage medium stores a program including causing a colorimetric system to acquire a colorimetric value obtained by performing colorimetry by a colorimetric unit; causing the colorimetric system to perform a display process of displaying a comparison graphic obtained by combining a reference color graphic of a reference color region with a sample color graphic of a sample color region; and causing the colorimetric system to compare a color value of a reference color set in the reference color region with a color value of a sample color set in the sample color region.

BRIEF DESCRIPTION OF THE DRAWINGS

FIG. 5 illustrates an example of a configuration of the colorimetric unit and a configuration of the terminal device.

FIG. 8 is a diagram describing a difference between an unlocked state and a locked state.

DESCRIPTION OF EXEMPLARY EMBODIMENTS

Hereinafter, an embodiment is described. The embodiment described below does not unduly limit the contents of the present disclosure described in the claims. In addition, not all configurations described in the embodiment are necessarily essential as solutions provided by the present disclosure.

Figure 1:
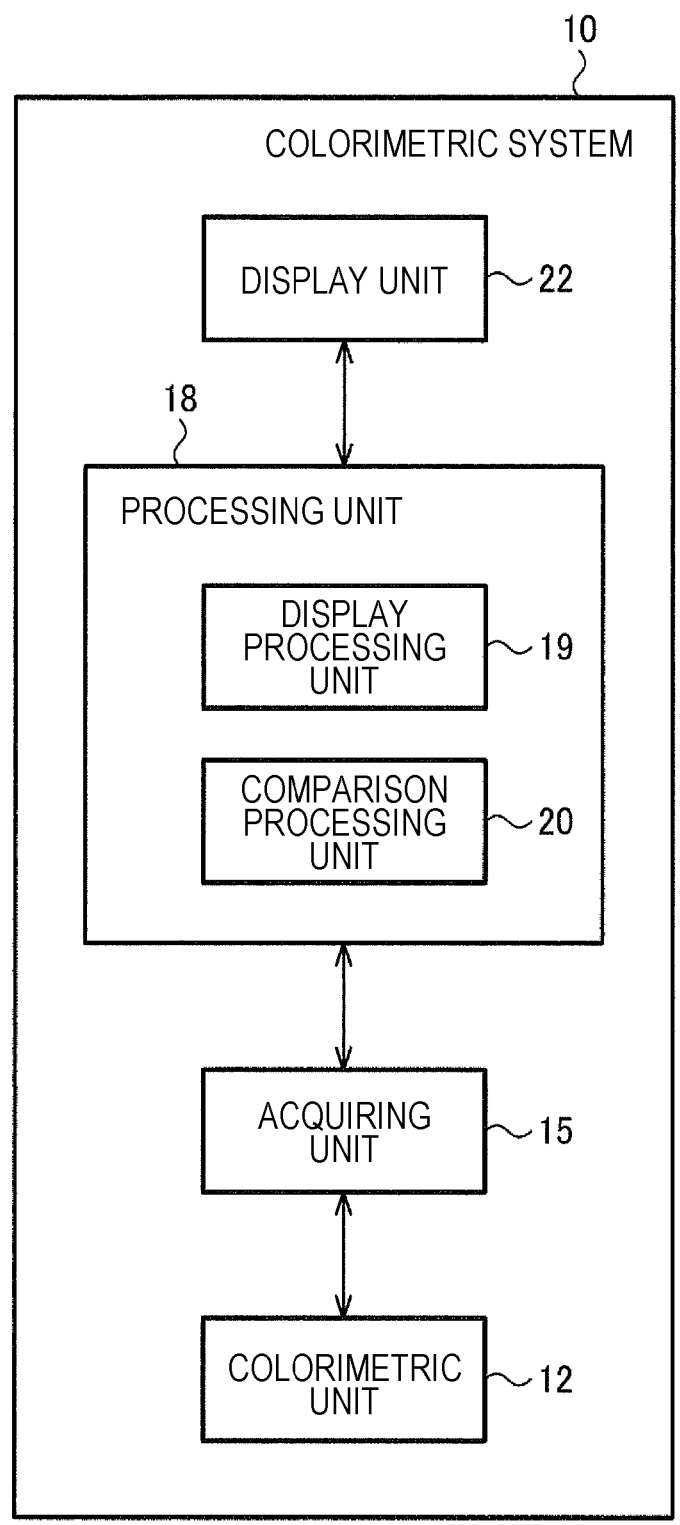
FIG. 1 is a block diagram describing an example of a configuration of a colorimetric system.

FIG. 1 is a block diagram describing an example of a configuration of a colorimetric system 10 according to the embodiment. The colorimetric system 10 according to the embodiment includes a colorimetric unit 12, an acquiring unit 15, and a processing unit 18. The processing unit 18 includes a display processing unit 19 and a comparison processing unit 20. In addition, the colorimetric system 10 may include a display unit 22. For example, the colorimetric system 10 may be implemented by a colorimeter 30 described later or may be implemented by the colorimeter 30 and a terminal device 60 described later. In addition, the colorimeter 30 can be implemented in various forms. For example, the colorimeter 30 is communicably connected to cloud computing or the like.

The colorimetric unit 12 performs colorimetry. For example, the colorimetric unit 12 performs colorimetry on a target color printed on a print medium or the like and outputs a colorimetric value that is a result of the colorimetry. The colorimetric unit 12 can be implemented by a colorimetric sensor or the like. As the colorimetric sensor, a spectroscopic sensor can be used, for example. For example, as the colorimetric sensor, a spectroscopic sensor of micro-electromechanical systems (MEMS) that can be mass-produced in a wafer-level process or the like can be used. The spectroscopic sensor is a sensor that measures a reflected spectrum, for example. Specifically, for example, the spectroscopic sensor can be implemented by a light source implemented by a light emitting diode (LED) or the like, an optical filter that receives light emitted by the light source and reflected on a measurement surface, selects a wavelength, and switches to the selected wavelength, a light receiving device that measures the amount of the reflected light that has passed through the optical filter, and the like. As the optical filter, etalon that is a wavelength filter that uses multiple interference of two opposing reflective surfaces or the like can be used. The spectroscopic sensor measures a reflected spectrum to measure the amount of reflected light for each wavelength of the reflected light, thereby performing colorimetry on a target color. The colorimetric sensor that implements the colorimetric unit 12 is not limited to the spectroscopic sensor. The colorimetric sensor may be implemented by an image sensor or the like, for example. In addition, the colorimetric unit 12 may not only perform colorimetry on reflected light but also perform colorimetry on transmitted light.

The acquiring unit 15 is a communication interface that acquires a colorimetric value obtained by performing colorimetry by the colorimetric unit 12. The acquiring unit 15 can be implemented by hardware such as a circuit device for communication or a program for communication. For example, the acquiring unit 15 can receive data of the colorimetric value via a wireless network or a wired network from the colorimetric unit 12 included in a device different from a device including the acquiring unit 15. The device including the acquiring unit 15 is, for example, the terminal device 60 described later. The device different from the device including the acquiring unit 15 is, for example, the colorimeter 30 described later. In addition, for example, the acquiring unit 15 may receive the data of the colorimetric value from the colorimetric unit 12 present in the same device as the device including the acquiring unit 15. In this case, the device is, for example, the colorimeter 30.

The processing unit 18 controls the units of the colorimetric system 10. The processing unit 18 may be implemented by a processor of a processing unit 62 of the terminal device 60 described later or the like, or may be implemented by a processor of a processing unit 32 of the colorimeter 30 described later, or may be implemented by both of the processors, which are described later in detail. The processing unit 18 performs each of processes according to the embodiment based on a program according to the embodiment. This program causes a computer to function as the units according to the embodiment. The computer is, for example, a device including an operation unit, a processing unit, a storage unit, and an output unit. For example, the program according to the embodiment causes the computer to function as the display processing unit 19 and the comparison processing unit 20. This program is stored in an information storage medium, for example. That is, the colorimetric system 10 according to the embodiment can perform each of the processes according to the embodiment based on the program stored in the information storage medium. The information storage medium is a computer-readable storage medium and stores the program, data, and the like. Functions of the information storage medium can be implemented by an optical disc, a hard disk drive (HDD), a semiconductor memory, or the like.

The display processing unit 19 performs a display process according to a process performed by the processing unit 18 based on the program according to the embodiment. For example, when the processing unit 18 acquires data of a colorimetric value via the acquiring unit 15, the display processing unit 19 displays color data based on the acquired data of the colorimetric value in a predetermined region of the display unit 22. Specifically, for example, the display unit 22 is a display unit 68 of the terminal device 60 but may be a display unit 38 of the colorimeter 30 or another display device. In the following description, data of a colorimetric value may be merely referred to as a colorimetric value, and color data may be merely referred to as a color.

Figure 2:
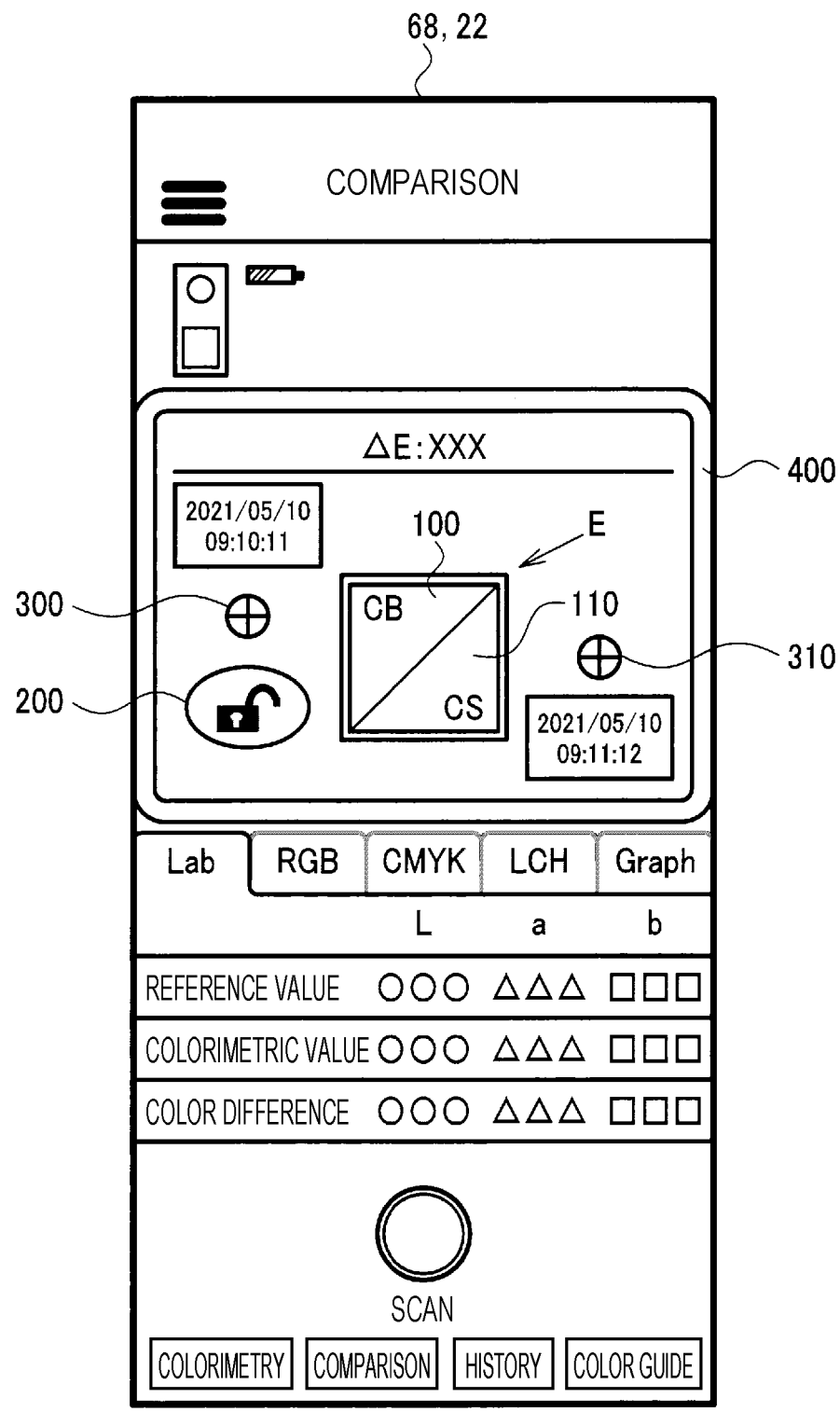
FIG. 2 illustrates a screen example for describing a comparison graphic.

The display processing unit 19 performs a display process of displaying a comparison graphic obtained by combining a reference color graphic of a reference color region 100 with a sample color graphic of a sample color region 110. For example, the display processing unit 19 performs a process of displaying a square graphic image icon as an image icon of the comparison graphic, as indicated by E in FIG. 2. In the following description, the image icon of the comparison graphic is merely referred to as a comparison graphic. In addition, the comparison graphic is divided into two portions by a single diagonal line. One of the portions is an image icon of the reference color graphic of the reference color region 100, while the other of the portions is an image icon of the sample color graphic of the sample color region 110. In the following description, the image icon of the reference color graphic is merely referred to as a reference color graphic, and the image icon of the sample color graphic is merely referred to as a sample color graphic. For example, the colorimetric unit 12 performs colorimetry on a desired color of a sample to be subjected to the colorimetry. When the acquiring unit 15 acquires a colorimetric value of the color, the display processing unit 19 performs a display process of filling the sample color region 110 with a sample color CS that is based on the colorimetric value. Similarly, the display processing unit 19 performs a display process of filling the reference color region 100 with a reference color CB. The reference color CB described in the embodiment is not limited to a color stored in a storage unit included in the colorimetric system 10 and not illustrated and may be a color based on a colorimetric value obtained by performing colorimetry by the colorimetric unit 12, for example. In addition, FIG. 2 is a diagram illustrating a case where the display unit 22 of the colorimetric system 10 corresponds to the display unit 68 of the terminal device 60 described later. However, the display processing unit 19 may perform a process of displaying, on the display unit 38 of the colorimeter 30, a screen that is the same as or similar to that illustrated in FIG. 2.

The comparison processing unit 20 compares a color value of the reference color CB set in the reference color region 100 with a color value of the sample color CS set in the sample color region 110. For example, the comparison processing unit 20 determines whether the reference color CB set in the reference color region 100 matches the sample color CS set in the sample color region 110. Matching the reference color CB and the sample color CS means satisfying an allowable condition for color matching. The allowable condition can be set by a user as appropriate. For example, when a color difference $\Delta E$ between the reference color CB and the sample color CS is smaller than a predetermined value, the comparison processing unit 20 determines that the reference color CB matches the sample color CS. The allowable condition may be another condition for the color difference $\Delta E$, a condition for an environmental light source, a condition for each color component, or a condition for a reflected spectrum. In addition, a combination of these conditions may be the allowable condition.

As described above, the colorimetric system 10 according to the embodiment includes the acquiring unit 15 that acquires a colorimetric value obtained by performing colorimetry by the colorimetric unit 12, the display processing unit 19 that performs a display process of displaying a comparison graphic obtained by combining the reference color graphic of the reference color region 100 with the sample color graphic of the sample color region 110, and the comparison processing unit 20 that compares the color value of the reference color CB set in the reference color region 100 with the color value of the sample color CS set in the sample color region 110. Since the colorimetric system 10 according to the embodiment includes the acquiring unit 15, the display processing unit 19, and the comparison processing unit 20, the colorimetric system 10 according to the embodiment can perform colorimetry using the comparison graphic obtained by combining the reference color graphic of the reference color region 100 with the sample color graphic of the sample color region 110. Therefore, the user can clearly visually recognize a change in the reference color CB and a change in the sample color CS and obtain a result of the colorimetry based on the color difference ΔE between the color value of the reference color CB and the color value of the sample color CS. Therefore, the user can perform colorimetry for various use cases. The colorimetric system 10 can provide the user with a user interface that supports various use cases for colorimetry. For example, since colorimetry is performed, the acquiring unit 15 may acquire the color value of the sample color CS and may acquire the color value of the reference color CB as described above. Therefore, when an appropriate user interface is not present, the user may erroneously determine what the acquiring unit 15 have acquired by the colorimetry. On the other hand, when a technique according to the embodiment is applied, the user can view the comparison graphic and easily grasp whether the reference color CB or the sample color CS has changed or whether both the reference color CB and the sample color CS have changed.

In addition, the technique according to the embodiment may be implemented as a colorimetric method. That is, the colorimetric method according to the embodiment includes acquiring a colorimetric value obtained by performing colorimetry by the colorimetric unit 12, performing a display process of displaying the comparison graphic obtained by combining the reference color graphic of the reference color region 100 with the sample color graphic of the sample color region 110, and comparing the color value of the reference color CB set in the reference color region 100 with the color value of the sample color CS set in the sample color region 110. This makes it possible to obtain the same effects as those described above.

In addition, the technique according to the embodiment may be implemented as the program. That is, the program according to the embodiment causes the colorimetric system 100 to acquire a colorimetric value obtained by performing colorimetry by the colorimetric unit 12, perform a display process of displaying the comparison graphic obtained by combining the reference color graphic of the reference color region 100 with the sample color graphic of the sample color region 110, and compare the color value of the reference color CB set in the reference color region 100 with the color value of the sample color CS set in the sample color region 110. This makes it possible to obtain the same effects as those described above.

The user interface according to the embodiment is not limited to the above-described comparison graphic and may be a user interface obtained by combining the comparison graphic with another image icon. For example, as illustrated in FIG. 2, the user interface according to the embodiment may be a user interface obtained by combining the comparison graphic with a lock button icon 200. The lock button icon 200 is a button icon for switching the state of the reference color CB between a locked state and an unlocked state. The locked state and the unlocked state are described later in detail with reference to FIG. 8 and the subsequent drawings. The user can properly use the locked state and the unlocked state to perform colorimetry suitable for each use case. For example, when the user selects the lock button icon 200 once in a state in which the lock button icon 200 is in a mode indicating the locked state, the lock button icon 200 changes from the mode indicating the locked state to a mode indicating the unlocked state. After that, when the user selects the lock button icon 200 one more time, the lock button icon 200 changes from the mode indicating the unlocked state to the mode indicating the locked state. The mode indicating the locked state and the mode indicating the unlocked state can be implemented using, for example, a key image as illustrated in FIG. 2, but may be implemented using another image. It is preferable to use an image from which the user can intuitively understand the locked state and the unlocked state. As described above, the display processing unit 19 performs a process of displaying, on the display unit 22, the lock button icon 200 for setting the reference color CB of the reference color region 100 to the locked state or the unlocked state. This enables the user to switch the state of the reference color CB to the locked state or the unlocked state on the screen of the display unit 22. Therefore, the colorimetric system 10 can provide the user with the user interface that appropriately supports a change in a use case.

In addition, for example, as illustrated in FIG. 2, the user interface may be a user interface obtained by combining the comparison graphic with a first button icon 300 and a second button icon 310. The first button icon 300 is a button icon for setting the reference color CB and is displayed at a position corresponding to the reference color region 100. The button icon for setting the reference color CB is a button icon for switching between a setting for setting the reference color CB based on an existing color and a setting for setting the reference color CB based on newly performed colorimetry by the user based on a use case. Displaying the first button icon 300 at the position corresponding to the reference color region 100 means displaying information indicating that the first button icon 300 is more related to the reference color region 100 than the sample color region 110 at a position where the user can recognize the information. The second button icon 310 is a button icon for setting the sample color CS and is displayed at a position corresponding to the sample color region 110. The button icon for setting the sample color CS is a button icon for switching between a setting for setting the sample color CS based on an existing color and a setting for setting the sample color CS based on newly performed colorimetry by the user based on a use case. Displaying the second button icon 310 at the position corresponding to the sample color region 110 means displaying information indicating that the second button icon 310 is more related to the sample color region 110 than the reference color region 100 at a position where the user can recognize the information. In this manner, the display processing unit 19 performs a process of displaying the first button icon 300 for setting the reference color CB at the position corresponding to the reference color region 100 and displaying the second button icon 310 for setting the sample color CS at the position corresponding to the sample color region 110. This enables the user to easily switch between the settings for setting the reference color CB and the sample color CS. Therefore, the colorimetric system 10 can provide the user with the user interface that can appropriately support a use case. Details after the user selects the first button icon 300 and the second button icon 310 are described with reference to FIGS. 6 and 7.

In addition, for example, as illustrated in FIG. 2, the user interface according to the embodiment may be a user interface obtained by combining the comparison graphic with a frame icon 400. The frame icon 400 is an icon of a frame-shaped image surrounding the comparison graphic. The frame icon 400 is displayed in the same color as that of the reference color region 100 changed by colorimetry performed last or of the sample color region 110 changed by colorimetry performed last, but specific examples of screens are described with reference to FIG. 10 and the subsequent drawings. That is, in the colorimetric system 10 according to the embodiment, the display processing unit 19 performs a process of displaying, on the display unit 22, the frame icon 400 that is based on a colorimetric value obtained by performing colorimetry last by the colorimetric unit 12 and surrounds the comparison graphic. This enables the user to recognize the color subjected to colorimetry last. Therefore, the user can reliably grasp whether the color set by the latest colorimetry is the reference color CB set in the reference color region 100 or the sample color CS set in the sample color region 110. Therefore, the colorimetric system 10 can provide the user with the user-friendly user interface.

Figure 3:
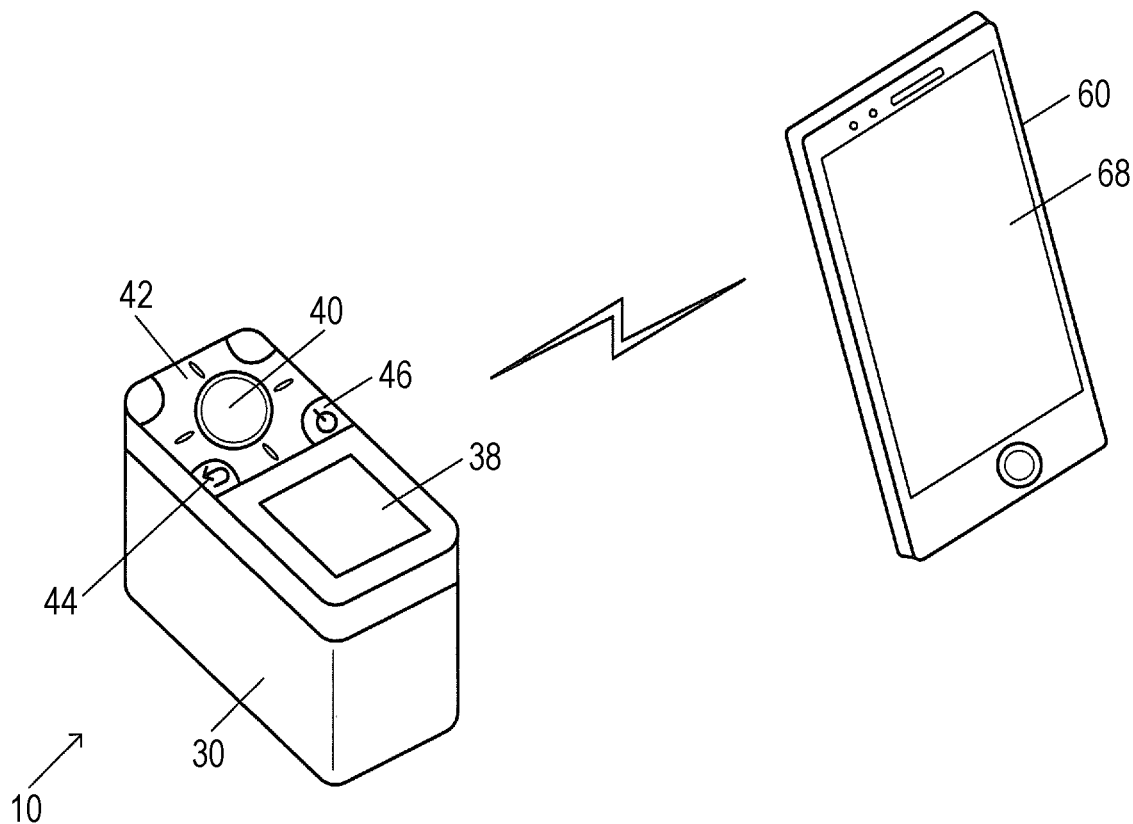
FIG. 3 illustrates an example of an exterior view of a colorimetric unit and a terminal device that implement the colorimetric system.
Figure 4:
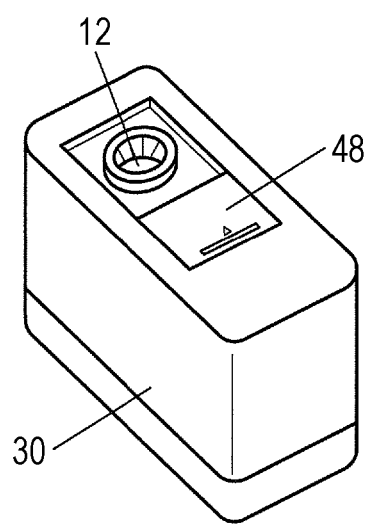
FIG. 4 illustrates an example of an exterior view of the colorimetric unit.

The colorimetric system 10 according to the embodiment is not limited to the above-described system and can be variously modified by adding another component or the like to the colorimetric system 10. FIGS. 3 and 4 illustrate an example of an exterior view of the colorimeter 30 and the terminal device 60 that constitute the colorimetric system 10 according to the embodiment. FIGS. 3 and 4 illustrate the example, and the colorimetric system 10 according to the embodiment may be constituted by only the colorimeter 30 as described above and can be variously modified. In addition, the exterior of the colorimeter 30 is not limited to the example illustrated in FIGS. 3 and 4 and the exterior of the terminal device 60 is not limited to the example illustrated in FIG. 3.

The colorimeter 30 illustrated in FIG. 3 has a substantially cubic shape and includes the display unit 38, a colorimetry button 40, and a cross key 42 on an upper surface of the colorimeter 30. The colorimeter 30 further includes a return button 44 and a power supply button 46 on the upper surface of the colorimeter 30. As illustrated in FIG. 4, the colorimeter 30 includes the colorimetric unit 12 and a shutter 48 on a lower surface of the colorimeter 30. The display unit 38 is implemented by, for example, a liquid crystal display, an organic EL display, or the like and displays various types of information to the user. The colorimetry button 40 is an operation device to be used by the user to instruct the colorimeter 30 to perform colorimetry. For example, when the user presses the colorimetry button 40, the colorimeter 30 performs colorimetry using the colorimetric unit 12. The cross key 42 is an operation device to be used to specify an upward direction, a downward direction, a leftward direction, or a rightward direction, or the like. The return button 44 is a button for performing a return operation that is also referred to as a back operation. The power supply button 46 is a button for turning on and off a power supply of the colorimeter 30. The colorimetric unit 12 is implemented by the colorimetric sensor or the like as described above and has, for example, a substantially circular shape in plan view. The shutter 48 protects the colorimetric unit 12 when the colorimeter 30 is not used. For example, when the colorimeter 30 is not used, the user moves the shutter 48 toward the colorimetric unit 12 to perform an operation of closing the shutter 48 to prevent an impact from the outside or the like from being applied to the colorimetric unit 12.

The colorimeter 30 illustrated in FIGS. 3 and 4 has a shape that enables colorimetry to be performed while the colorimeter 30 is held by the user with one hand. For example, the user uses a thumb, a middle finger, a ring finger, a little finger, and the like to hold a side surface of the colorimeter 30 and uses an index finger to press the colorimetry button 40 or to press the cross key 42 to specify a direction. However, the colorimeter 30 illustrated in FIGS. 3 and 4 is an example and may have another shape.

The terminal device 60 is a communication terminal that can be communicably connected to the colorimeter 30 and is implemented by, for example, a smartphone, a tablet personal computer (PC), or the like. The terminal device 60 is communicably connected to the colorimeter 30 via wireless communication such as Bluetooth (registered trademark), Wi-Fi (registered trademark), or the like. The terminal device 60 includes the display unit 68 and an operation device such as an operation button. In addition, the display unit 68 is, for example, a touch panel, and the user touches the display unit 68, which is a touch panel, to perform various operations.

FIG. 5 is a block diagram illustrating an example of a configuration of the colorimetric system 10 including the colorimeter 30 and the terminal device 60. The colorimetric system 10 including the colorimeter 30 and the terminal device 60 is not limited to the configuration illustrated in FIG. 5 and can be variously modified by omitting one or more of components of the colorimetric system 10, adding another component to the colorimetric system 10, and the like.

The colorimeter 30 includes the colorimetric unit 12, the processing unit 32, an operation unit 34, a storage unit 36, the display unit 38, and a communication unit 39. The colorimetric unit 12 is implemented by the colorimetric sensor or the like as described above.

The processing unit 32 performs each of processes of controlling the units of the colorimeter 30 and each of the processes according to the embodiment. For example, the processing unit 32 performs a process of controlling the colorimetric unit 12 and a process of acquiring colorimetric data from the colorimetric unit 12. In addition, the processing unit 32 performs a process of inputting user operation information input by the operation unit 34, a process of reading information from the storage unit 36, and a process of writing information to the storage unit 36. In addition, the processing unit 32 performs a process of displaying information on the display unit 38, a process of controlling communication of the communication unit 39, and the like. The processing unit 32 can be implemented by a processor. For example, each of the processes according to the embodiment can be implemented by a processor that operates based on information of the program or the like and a memory storing the information of the program or the like. The memory is the storage unit 36. For example, a function of each part of the processor may be implemented by individual hardware parts or may be implemented by unified hardware. For example, the processor may include hardware that includes at least one of a circuit that processes a digital signal and a circuit that processes an analog signal. For example, the processor can be constituted by one or multiple circuit devices implemented on a circuit board or can be constituted by one or multiple circuit elements implemented on a circuit board. The processor may be, for example, a central processing unit (CPU). However, the processor is not limited to the CPU. Various processors such as a graphics processing unit (GPU) and a digital signal processor (DSP) can be used as the processor. In addition, the processor may be a hardware circuit constituted by an application specific integrated circuit (ASIC). The processor may include an amplifier circuit that processes an analog signal, a filter circuit, and the like.

The operation unit 34 is an operation interface for inputting user operation information. The operation unit 34 can be implemented by an operation device. In the example illustrated in FIG. 3, the operation unit 34 can be implemented by operation devices such as the colorimetry button 40, the cross key 42, the return button 44, and the power supply button 46. However, an operation device that implements the operation unit 34 is not limited to these operation devices.

The storage unit 36 stores various types of information. For example, the storage unit 36 stores the program and data. The storage unit 36 functions as, for example, a work area of the processing unit 32 and a work area of the communication unit 39. For example, the storage unit 36 that is the memory may be a semiconductor memory such as a static random-access memory (SRAM) or a dynamic random-access memory (DRAM), a register, a hard disk drive, or the like. For example, the storage unit 36 that is the memory stores a computer-readable command, and the processing unit 32 that is the processor executes the command to implement a process of each part of the processing unit 32. In this case, the command may be a command set constituting the program or may be a command to instruct the hardware circuit of the processor to operate.

The display unit 38 displays various types of information to the user. The display unit 38 can be implemented by, for example, various displays such as a liquid crystal display and an organic EL display. The display unit 38 displays, for example, information necessary for the user to operate the colorimeter 30 and status information of various statuses of the colorimeter 30.

The communication unit 39 is a communication interface that performs wireless or wired communication with an external device. The communication unit 39 can be implemented by, for example, hardware such as an ASIC for communication or a processor for communication, firmware for communication, or the like. For example, the communication unit 39 communicates with an external device such as the terminal device 60 via near field communication such as Bluetooth. Specifically, the communication unit 39 communicates with the external device via wireless communication according to the Bluetooth Low Energy (BLE) standard. Alternatively, the communication unit 39 may communicate with the external device via wireless communication according to another standard such as Wi-Fi. In addition, the communication unit 39 may perform wired communication according to a standard such as USB.

The terminal device 60 includes the processing unit 62, an operation unit 64, a storage unit 66, the display unit 68, and a communication unit 69.

The processing unit 62 performs processes of controlling the units of the terminal device 60 and each of the processes according to the embodiment. For example, the processing unit 62 performs a process of inputting user operation information input by the operation unit 64, a process of reading information from the storage unit 66, and a process of writing information to the storage unit 66. In addition, the processing unit 62 performs a process of displaying information on the display unit 68, a process of controlling communication of the communication unit 69, and the like. The processing unit 62 can be implemented by the above-described processor or the like.

The operation unit 64 is an operation interface that inputs user operation information. The operation unit 64 can be implemented by an operation device. In the example illustrated in FIG. 3, the operation unit 64 can be implemented by an operation device such as a touch panel of the display unit 68 or an operation button provided in the terminal device 60. However, an operation device that implements the operation unit 64 is not limited to these operation devices.

The storage unit 66 stores various types of information. For example, the storage unit 66 stores the program and data. The storage unit 66 functions as, for example, a work area of the processing unit 62 and a work area of the communication unit 69. For example, the storage unit 66 that is a memory may be a semiconductor memory such as an SRAM or a DRAM, a register, a hard disk drive, or an optical disc drive. For example, the storage unit 66 that is the memory stores a computer-readable command, and the processing unit 62 that is a processor executes the command to implement a process of each part of the processing unit 62.

The display unit 68 displays various types of information to the user. The display unit 68 can be implemented by various displays such as a liquid crystal display and an organic EL display, for example. In addition, the display unit 68 is implemented by, for example, a touch panel and functions as the operation unit 64. The display unit 68 displays, for example, information necessary for the user to operate the terminal device 60, status information of various statuses of the terminal device 60 and the colorimeter 30, and the like.

The communication unit 69 is a communication interface that performs wireless or wired communication with an external device. The communication unit 69 can be implemented by, for example, hardware such as an ASIC for communication or a processor for communication, firmware for communication, or the like. For example, the communication unit 69 communicates with an external device such as the colorimeter 30 via near field communication such as Bluetooth. Specifically, the communication unit 69 communicates with the external device via wireless communication according to the BLE standard. Alternatively, the communication unit 69 may communicate with the external device via wireless communication according to another standard such as Wi-Fi. In addition, the communication unit 69 may perform wired communication according to a standard such as USB.

As described above, the processes of the colorimetric system 10 according to the embodiment may be implemented by, for example, the processing unit 62 of the terminal device 60. In this case, the processing unit 62 includes the processing unit 18, the display processing unit 19, and the comparison processing unit 20 and performs the processes of these units. For example, the program according to the embodiment is installed as an application program in the terminal device 60 and stored in the storage unit 66. The application program executes processes of an accepting unit 14, the processing unit 18, the display processing unit 19, and the comparison processing unit 20. Alternatively, the processes of the colorimetric system 10 may be implemented by the processing unit 32 of the colorimeter 30. In this case, the processing unit 32 includes the processing unit 18, the display processing unit 19, and the comparison processing unit 20 and performs the processes of these units. For example, the program stored in the storage unit 36 executes the processes of the accepting unit 14, the processing unit 18, the display processing unit 19, and the comparison processing unit 20. Alternatively, the processes of the colorimetric system 10 may be implemented by a distributed process of the processing unit 32 and the processing unit 62.

Next, a screen example in which the technique according to the embodiment is applied is described. The screen example described below is an example of a screen displayed on the display unit 68 of the terminal device 60 but may be an example of a screen displayed on the display unit 38 of the colorimeter 30 or may be an example of a screen displayed on each of the display unit 68 of the terminal device 60 and the display unit 38 of the colorimeter 30. The user can determine a screen among the screens as appropriate. Processes of displaying exemplary screens described below are processes to be performed by the processing unit 62 as the display processing unit 19, but are merely described below as processes to be performed by the display processing unit 19.

Figure 6:
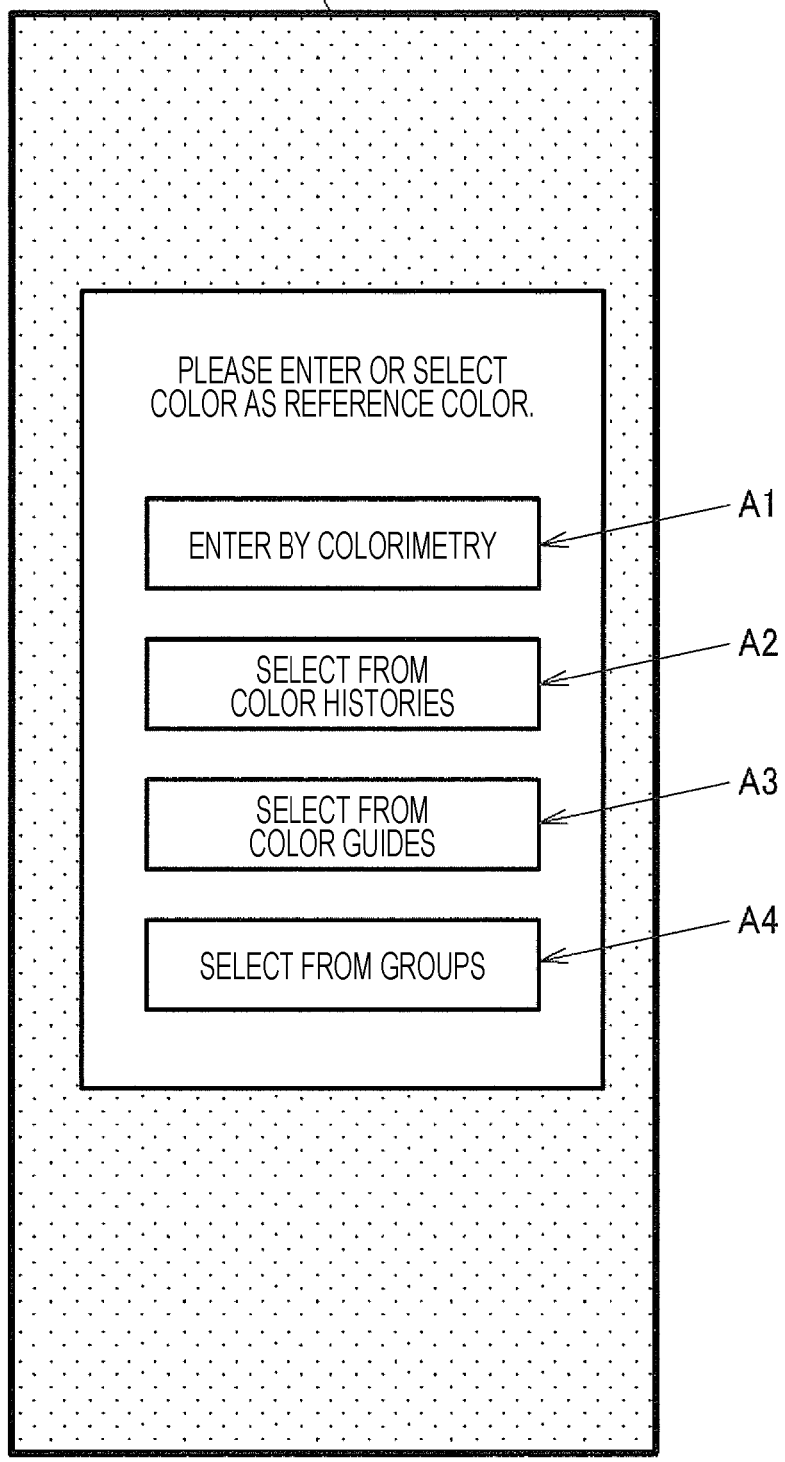
FIG. 6 illustrates a screen example for describing a first selection menu screen.
Figure 7:
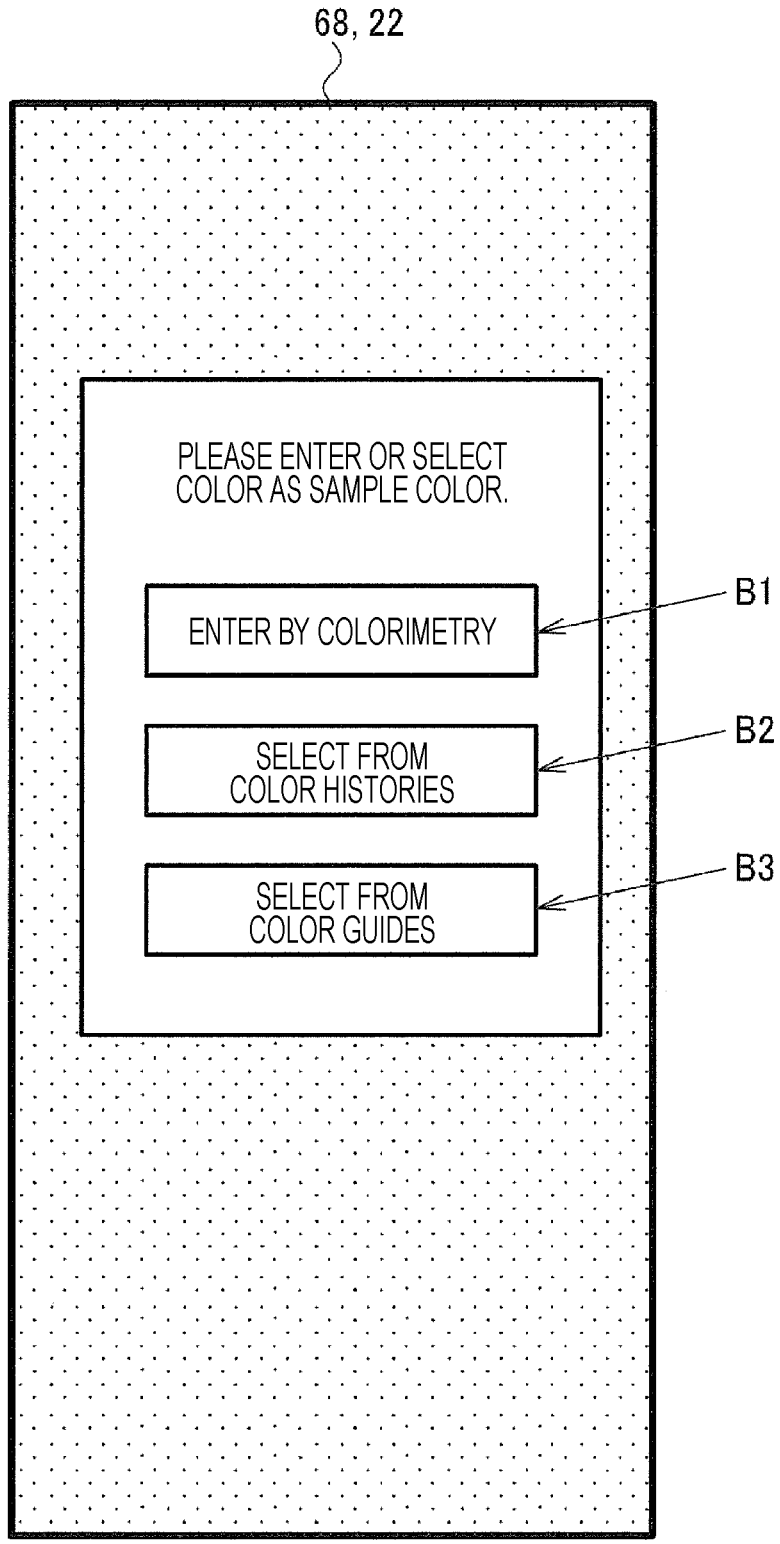
FIG. 7 illustrates a screen example for describing a second selection menu screen.

A method for setting the reference color CB and the sample color CS is described using screen examples illustrated in FIGS. 6 and 7. For example, when the user selects the first button icon 300 illustrated in FIG. 2, a dialog box illustrated in FIG. 6 is displayed as a first selection menu screen on the display unit 68. Similarly, when the user selects the second button icon 310 illustrated in FIG. 2, a dialog box illustrated in FIG. 7 is displayed as a second selection menu screen on the display unit 68. Although the first selection menu screen is displayed as the dialog box in FIG. 6, the display processing unit 19 may perform a display process of causing the screen illustrated in FIG. 2 to transition to another screen that is the first selection menu screen, for example. The same applies to the second selection menu screen illustrated in FIG. 7. That is, in the colorimetric system 10 according to the embodiment, when the first button icon 300 is selected, the display processing unit 19 performs a process of displaying the first selection menu screen for selecting the reference color CB to be set in the reference color region 100. When the second button icon 310 is selected, the display processing unit 19 performs a process of displaying the second selection menu screen for selecting the sample color CS to be set in the sample color region 110. This enables the user to set the reference color CB and the sample color CS in detail.

In the dialog box illustrated in FIG. 6, a selection icon that states "Enter by colorimetry" indicated by A1, a selection icon that states "Select from color histories" indicated by A2, a selection icon that states "Select from color guides" indicated by A3, and a selection icon that states "Select from groups" indicated by A4 are displayed. When the user selects the selection icon that states "Enter by Colorimetry" indicated by A1, a color based on a colorimetric value obtained by performing colorimetry by the colorimetric unit 12 is set as the reference color CB in the reference color region 100. In addition, when the user selects the selection icon that states "Select from color histories" indicated by A2, a color subjected to colorimetry in the past and stored in the storage unit 66 is displayed such that the user can select the displayed color. The color is not illustrated in FIG. 6. The color selected by the user is set as the reference color CB in the reference color region 100. When the user selects the selection icon that states "Select from color guides" indicated by A3, a color based on a predetermined color guide book stored in the storage unit 66 is displayed such that the user can select the displayed color. The color is not illustrated in FIG. 6. The predetermined color guide book is PANTONE (registered trademark) colors, DIC (registered trademark) colors, or the like. The color selected by the user is set as the reference color CB in the reference color region 100. When the user selects the selection icon that states "Select from groups" indicated by A4 in FIG. 6, a screen indicating a list of color groups is displayed and the reference color CB is set in the reference color region 100 based on a color of a color group selected by the user. The screen indicating list is not illustrated in FIG. 6. The color group is a set of a number n (n is an integer of 2 or more) of colors to be compared. That is, the selection icon that states "Select from groups" indicated by A4 is an icon for setting group colorimetry.

In the dialog box illustrated in FIG. 7, a selection icon that states "Enter by colorimetry" indicated by B1, a selection icon that states "Select from color histories" indicated by B2, and a selection icon that states "Select from color guides" indicated by B3 are displayed. When the user selects the selection icon that states "Enter by colorimetry" indicated by B1, a color based on a colorimetric value obtained by performing colorimetry by the colorimetric unit 12 is set as the sample color CS in the sample color region 110. In addition, when the user selects the selection icon that states "Select from color histories" indicated by B2, a color subjected to colorimetry in the past and stored in the storage unit 66 is displayed such that the user can select the displayed color. The color is not illustrated in FIG. 7. The color selected by the user is set as the sample color CS in the sample color region 110. In addition, when the user selects the selection icon that states "Select from color guides" indicated by B3, a color based on a predetermined color guide book stored in the storage unit 66 is displayed such that the user can select the displayed color. The color is not illustrated in FIG. 7. The predetermined color guide book is, for example, PANTONE colors, DIC colors, or the like. Then, the color selected by the user is set as the sample color CS in the sample color region 110. In the dialog box illustrated in FIG. 7, the selection icon that states "Select from groups" indicated by A4 in FIG. 6 is not displayed. This is due to the fact that this icon is an icon for setting group colorimetry based on color groups as described above and is related to the setting of the reference color CB but is not related to the setting of the sample color CS. As described above, in the colorimetric system 10 according to the embodiment, the display processing unit 19 performs a process of displaying, as the reference color CB, a color selected based on at least one of a color guide, a colorimetric value, a color history value, and a reference color group on the first selection menu screen, and performs a process of displaying, as the sample color CS, a color selected based on at least one of the color guide, the colorimetric value, and the color history value on the second selection menu screen. This enables the user to obtain the reference color CB and the sample color CS by various methods. Therefore, the user can handle various use cases.

Although a technique that supports a use case in which an existing color is used as the reference color CB and a color subjected to colorimetry is used as the sample color CS is known, the known technique does not support a use case in which the reference color CB is not an existing color and a use case in which the sample color CS is not a color subjected to colorimetry. On the other hand, when the technique according to the embodiment is applied, the user can perform colorimetry that supports various use cases.

Figure 12:
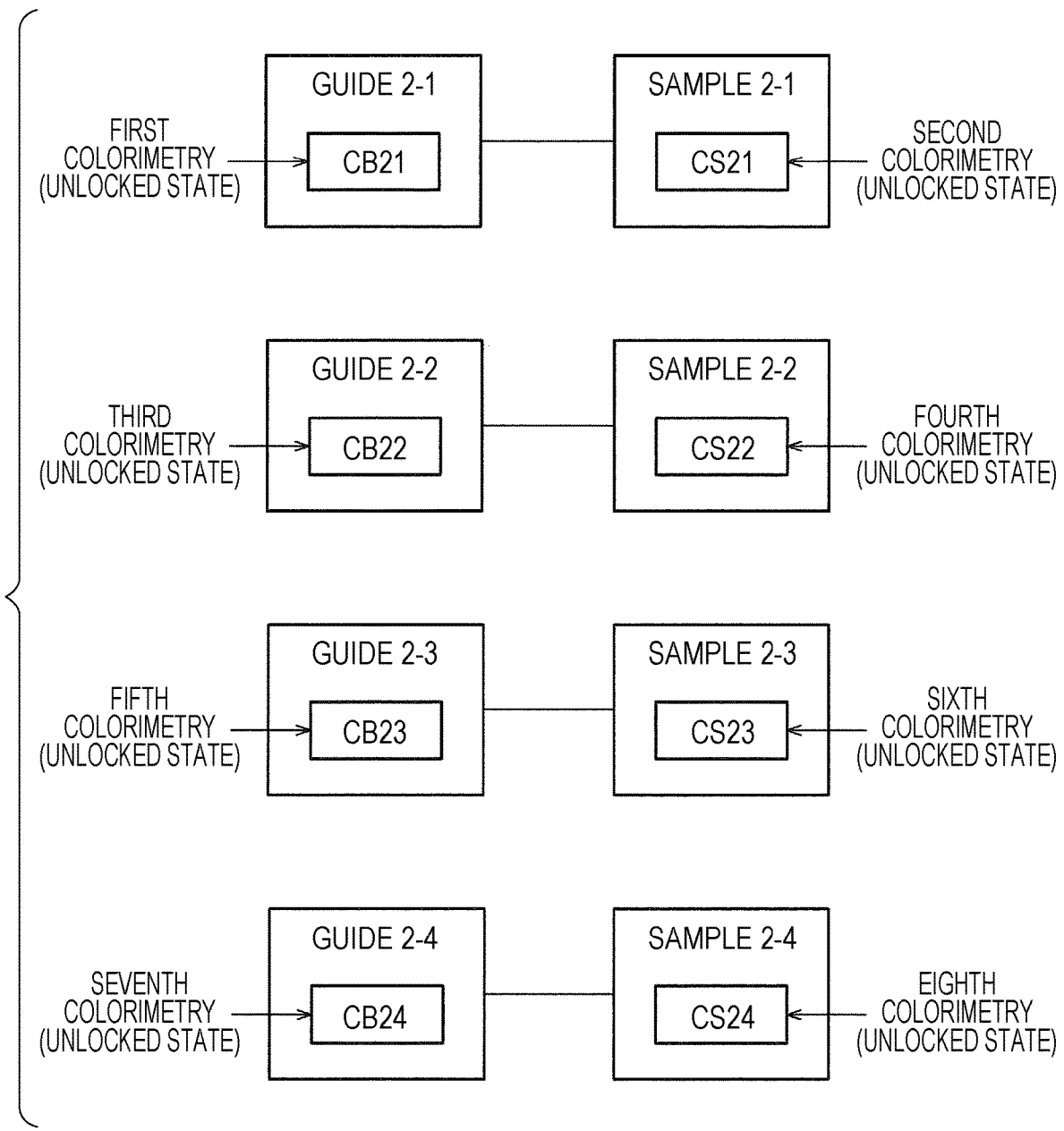
FIG. 12 is a diagram describing a second use case.

Therefore, the colorimetric system 10 can provide the user with the user-friendly user interface. The use case in which the reference color CB is not an existing color is, for example, a case where a printing company that is a user produces a sample including a color based on a request, the requested color is changed or the like after the production of the sample, and whether the produced sample is in an allowable range with respect to a newly requested color is checked due to the change in the requested color or the like. In this case, an existing color is not registered in the colorimetric system 10, the user needs to perform colorimetry on a sample including the newly requested color and treat the color as the reference color CB. In addition, the use case in which the sample color CS is not a color subjected to colorimetry is, for example, a case where a result of performing colorimetry on a sample largely deviates from a result of performing colorimetry in design or the like, and whether the colorimetric system 10 has a failure when an existing color is used as the sample color CS due to the deviation or the like is checked, or the like. A use case in which the user selects the selection icon that states "Enter by colorimetry" indicated by A1 in FIG. 6 for the setting of the reference color CB, and selects the selection icon that states "Enter by colorimetry" indicated by B1 in FIG. 7 for the setting of the sample color CS is described below. As the use case, a first use case described later with reference to FIG. 9 and a second use case described later with reference to FIG. 12 are considered, but another use case can be considered.

Next, a difference between the locked state and the unlocked state is described with reference to FIG. 8. It is assumed that the acquiring unit 15 acquires a colorimetric value based on a color CM1 in the first colorimetry, acquires a colorimetric value based on a color CM2 in the second colorimetry, acquires a colorimetric value based on a color CM3 in the third colorimetry, and acquires a colorimetric value based on a color CM4 in the fourth colorimetry.

When the state of the reference color CB is the locked state, the color CM1 is set in the reference color region 100 in the first colorimetry. In the second colorimetry, while the color CM1 remains set in the reference color region 100, the color CM2 is set in the sample color region 110. In the third colorimetry, while the color CM1 remains set in the reference color region 100, the color CM3 is set in the sample color region 110. In the fourth colorimetry, while the color CM1 remains set in the reference color region 100, the color CM4 is set in the sample color region 110. As described above, when the state of the reference color CB is the locked state, the reference color CB set in the reference color region 100 is the color CM1 set first and remains as the color CM1 in the colorimetry performed after the first colorimetry.

On the other hand, when the state of the reference color CB is the unlocked state, the color CM1 is set in the reference color region 100 in the first colorimetry. In the second colorimetry, while the color CM1 remains set in the reference color region 100, the color CM2 is set in the sample color region 110. In the third colorimetry, the color CM2 is set in the reference color region 100 and the color CM3 is set in the sample color region 110. In terms of this feature, the unlocked state is different from the locked state. Similarly, in the fourth colorimetry, the color CM3 is set in the reference color region 100 and the color CM4 is set in the sample color region 110. In terms of this feature, the unlocked state is different from the locked state. As described above, when the state of the reference color CB is the unlocked state, the sample color CS subjected to the previous colorimetry is set in the reference color region 100 in the latest colorimetry. Although described later in detail with reference to FIGS. 14 and 15, the sample color CS is displayed in the reference color region 100 by the third colorimetry, the reference color CB is displayed in the reference color region 100 by the fourth colorimetry, and after that, these display operations are repeated. Therefore, it can be considered that the display processing unit 19 performs a toggling display process.

Figure 9:
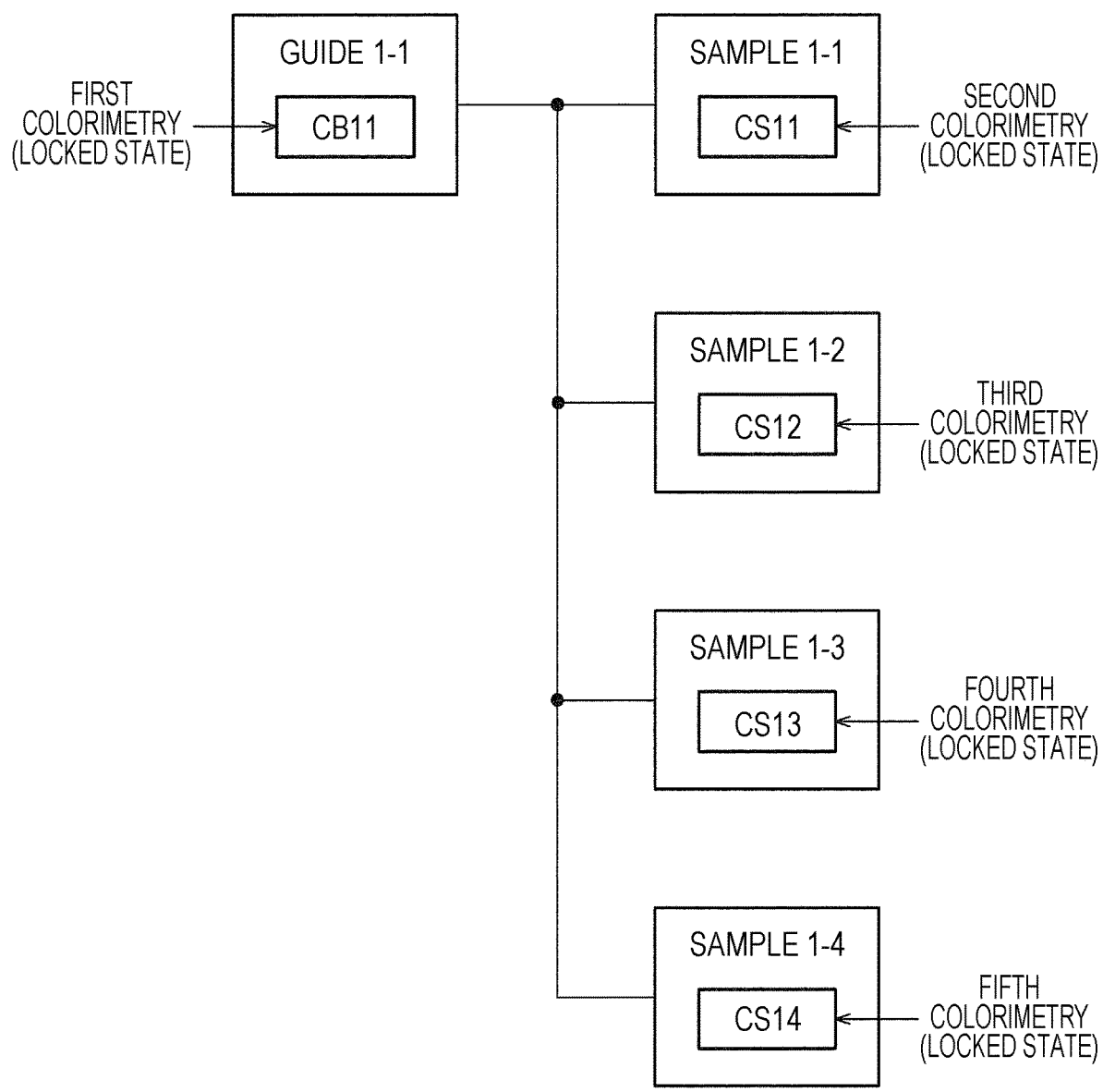
FIG. 9 is a diagram describing a first use case.

Next, the first use case suitable for a case where the state of the reference color CB is the locked state, and an example of a screen for colorimetry in the first use case are described with reference to FIGS. 9, 10, and 11. As illustrated in FIG. 9, in the first case, a single color for guide is treated as the reference color CB, and a plurality of samples is treated as the sample color CS. In the following description, performing colorimetry on a color applied to a guide and targeted for colorimetry is merely referred to as performing colorimetry on a guide. Similarly, performing colorimetry on a color applied to a sample and targeted for colorimetry is merely referred to as performing colorimetry on a sample. In addition, for example, a color CB11 illustrated in FIG. 9 is a color displayed on the display unit 68 as a result of performing colorimetry on a guide 1-1, but is merely referred to as the color CB11 of the guide 1-1 in the following description. The same applies to other colors illustrated in FIG. 9 and colors illustrated in FIG. 12. Specifically, although a color set in the reference color region 100 is only the color CB11 of the guide 1-1, colors set in the sample color region 110 are four colors, a color CS11 of a sample 1-1, a color CS12 of a sample 1-2, a color CS13 of a sample 1-3, and a color CS14 of a sample 1-4. In this case, by setting the state of the reference color CB to the locked state and performing colorimetry on the samples 1-1 to 1-4 after performing colorimetry on the guide 1-1, it is possible to compare the color CB11 with the color CS11, compare the color CB11 with the color CS12, compare the color CB11 with the color CS13, and compare the color CB11 with the color CS14.

Figure 10:
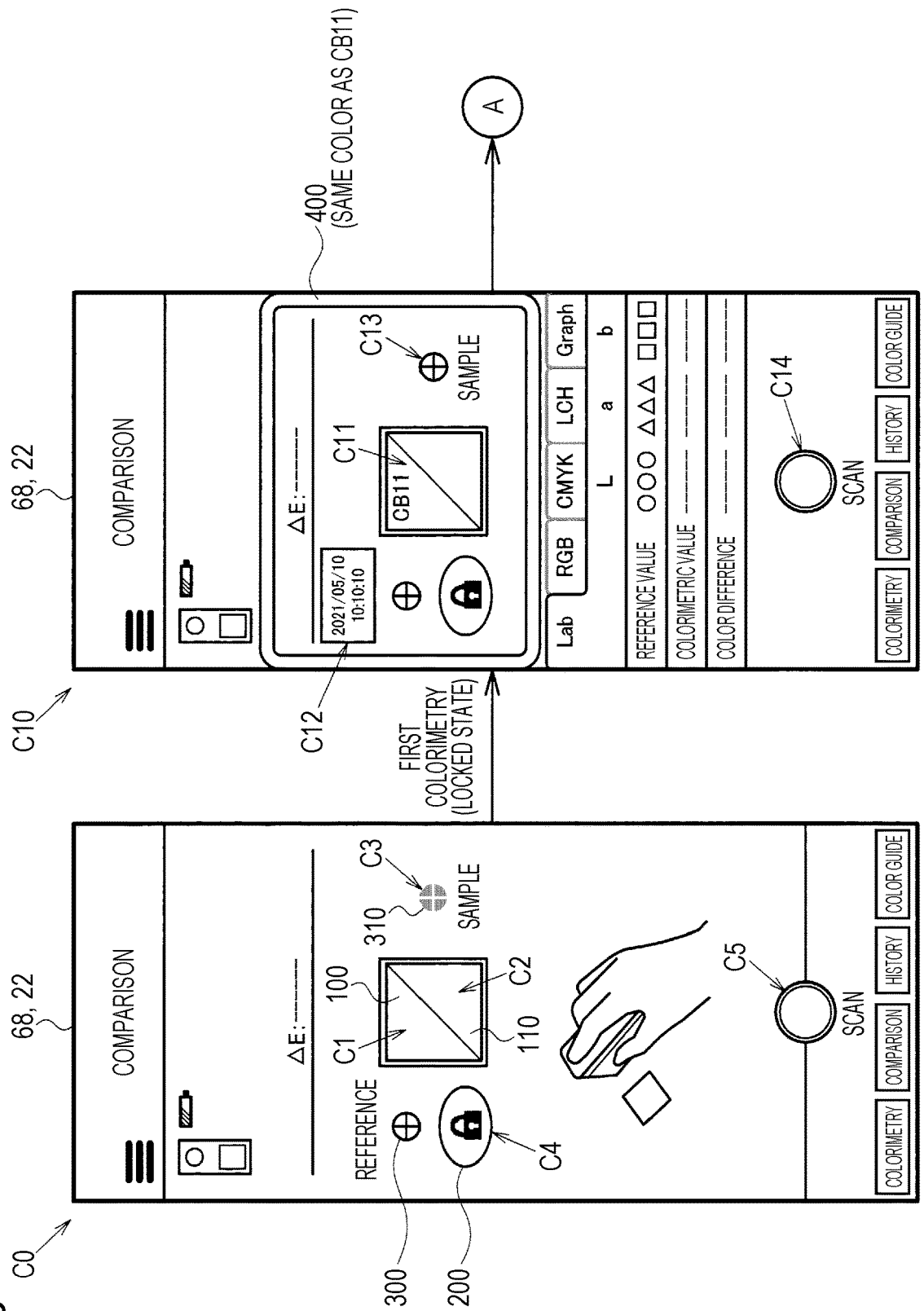
FIG. 10 is a diagram describing an example of screen transition when colorimetry is performed in the locked state.
Figure 11:
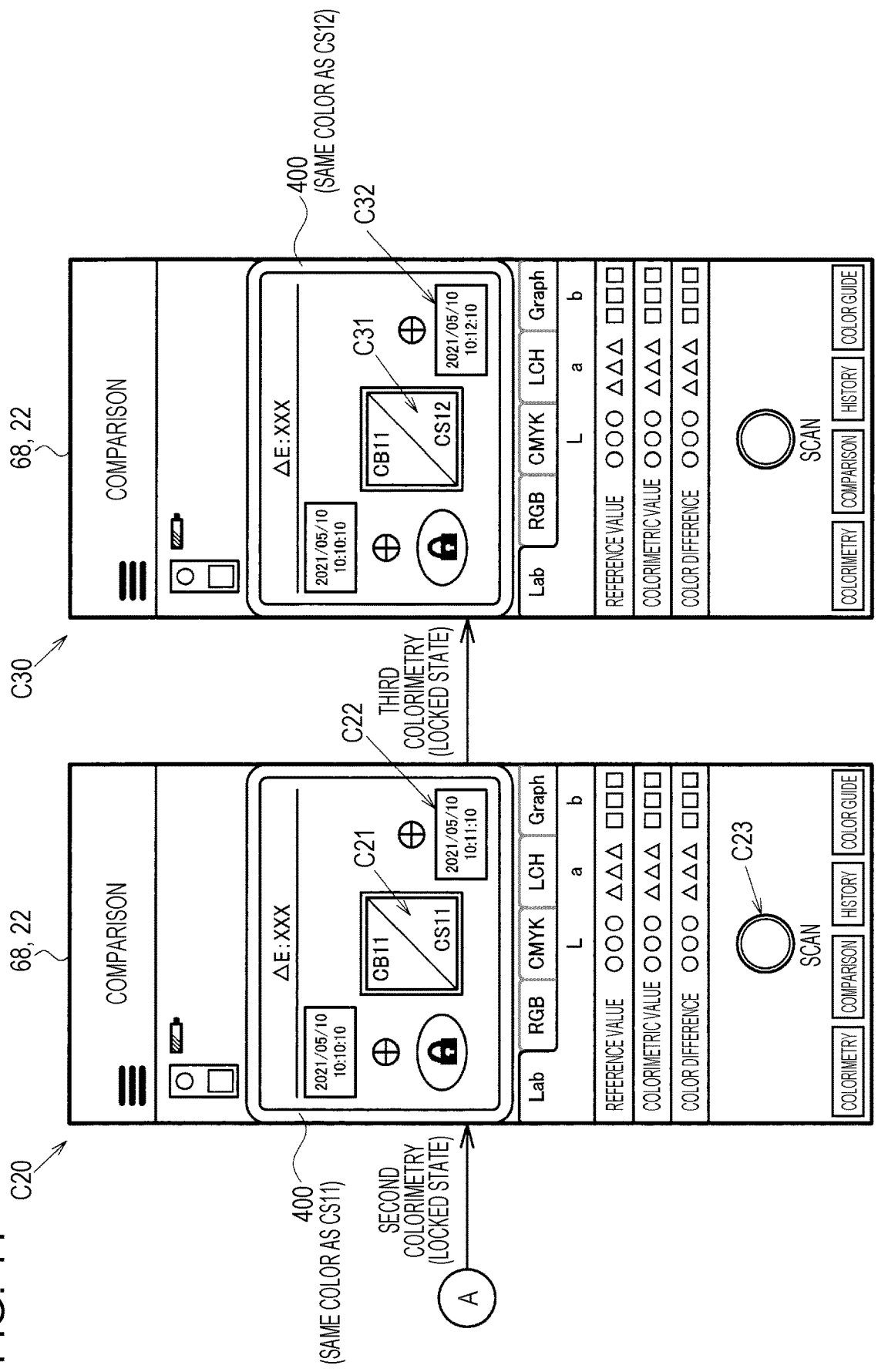
FIG. 11 is a diagram describing another example of the screen transition when the colorimetry is performed in the locked state.

FIGS. 10 and 11 are diagrams illustrating specific examples of screens for colorimetry in the first use case and the transition of the screens. When the user activates a predetermined application program of the terminal device 60, the display processing unit 19 displays a screen indicated by C0 on the display unit 68. Immediately after the activation of the application program, the reference color region 100 is displayed as a blank region as indicated by C1, and the sample color region 110 is displayed as a blank region as indicated by C2. In this case, the user cannot use the second button icon 310. That is, in the colorimetric system 10 according to the embodiment, when the reference color CB is not set in the reference color region 100 and the sample color CB is not set in the sample color region 110, the display processing unit 19 performs a display process of disabling the second button icon 310. This enables the user to prevent the sample color CS from being set in the sample color region 110 in a state in which the reference color CB is not set in the reference color region 100. This can avoid a problem such as a failure of the application program of the terminal device 60, for example.

Specifically, as indicated by C3, the display processing unit 19 displays the second button icon 310 such that the second button icon 310 is grayed out. However, the second button icon 310 is not limited thereto. For example, the display processing unit 19 may display the second button icon 310 in a semitransparent manner or may temporarily delete the second button icon 310, and the user can set the second button icon 310 as appropriate. That is, in the colorimetry system 10 according to the embodiment, when the reference color CB is not set in the reference color region 100 and the sample color CS is not set in the sample color region 110, the display processing unit 19 performs a display process of graying out the second button icon 310. This enables the user to recognize that the second button icon 310 is disabled. Therefore, it is possible to avoid a problem such as a failure of the application program of the terminal device 60.

On the screen indicated by C0, the lock button icon 200 in the mode indicating that the state of the reference color CB is the locked state is displayed as indicated by C4. When the user selects a button icon indicated by C5 in the locked state, the first colorimetry is performed and the screen indicated by C0 transitions to a screen indicated by C10. On the exemplary screen indicated by C10, the reference signs of the reference color region 100, the sample color region 110, the lock button icon 200, the first button icon 300, and the second button icon 310 are omitted. The same applies to an exemplary screen indicated by C20 and an exemplary screen indicated by C30. On the screen indicated by C10, the color CB11 of the guide 1-1 is set in the reference color region 100 as indicated by C11. In addition, as indicated by C12, information of the time when the colorimetry has been performed on the color CB11 is displayed. Furthermore, as indicated by C13, the second button icon 310 is in the same display mode as the first button icon 300. Therefore, the user can recognize that the second button icon 310 is enabled. In addition, a frame icon 400 is displayed in the same color as the color CB11 relating to the colorimetry performed last.

When the user selects a button icon indicated by C14, the second colorimetry is performed and the screen indicated by C10 transitions to the screen indicated by C20 in FIG. 11. As indicated by C21, on the screen indicated by C20, the color CS11 of the sample 1-1 is set in the sample color region 110. In addition, as indicated by C22, information of the time when the colorimetry has been performed on the color CS11 is displayed. In addition, the frame icon 400 is displayed in the same color as the color CS11 relating to the colorimetry performed last.

When the user selects a button icon indicated by C23, the third colorimetry is performed and the screen indicated by C20 transitions to the screen indicated by C30. As indicated by C31, on the screen indicated by C30, the color CS12 of the sample 1-2 is set in the sample color region 110. In addition, as indicated by C32, information of the time when the colorimetry has been performed on the color CS12 is displayed. In addition, the frame icon 400 is displayed in the same color as the color CS12 relating to the colorimetry performed last. Since a case where the color CS13 of the sample 1-3 is displayed by the fourth colorimetry and a case where the color CS14 of the sample 1-4 is displayed by the fifth colorimetry are the same as or similar to the description made with reference to FIG. 11, descriptions of these cases are omitted.

Next, the second use case suitable for a case where the state of the reference color CB is the unlocked state, and an example of a screen for colorimetry in the second use case are described with reference to FIGS. 12, 13, 14, and 15. As illustrated in FIG. 12, in the second use case, a plurality of combinations of a single guide and a single sample is present, and it is necessary to reset a reference color CB that differs for each of the combinations and a sample color CS that differs for each of the combinations. Specifically, a color CB21 applied to a guide 2-1 is set in the reference color region 100 and a color CS21 applied to a sample 2-1 is set in the sample color region 110. After that, a color CB22 applied to a guide 2-2 is set in the reference color region 100 and a color CS22 applied to a sample 2-2 is set in the sample color region 110. After that, a color CB23 applied to a guide 2-3 is set in the reference color region 100 and a color CS23 applied to a sample 2-3 is set in the sample color region 110. After that, a color CB24 applied to a guide 2-4 is set in the reference color region 100 and the color CS24 applied to a sample 2-4 is set in the sample color region 110. In this case, it is convenient that the user performs colorimetry on the guide 2-1 to set the color CB21 in the reference color region 100, sets the reference color CB to the unlocked state, and performs colorimetry on the sample 2-1, the guide 2-2, the sample 2-2, the guide 2-3, the sample 2-3, the guide 2-4, and the sample 2-4 in this order. The reason is described using FIGS. 13 to 15.

Figure 13:
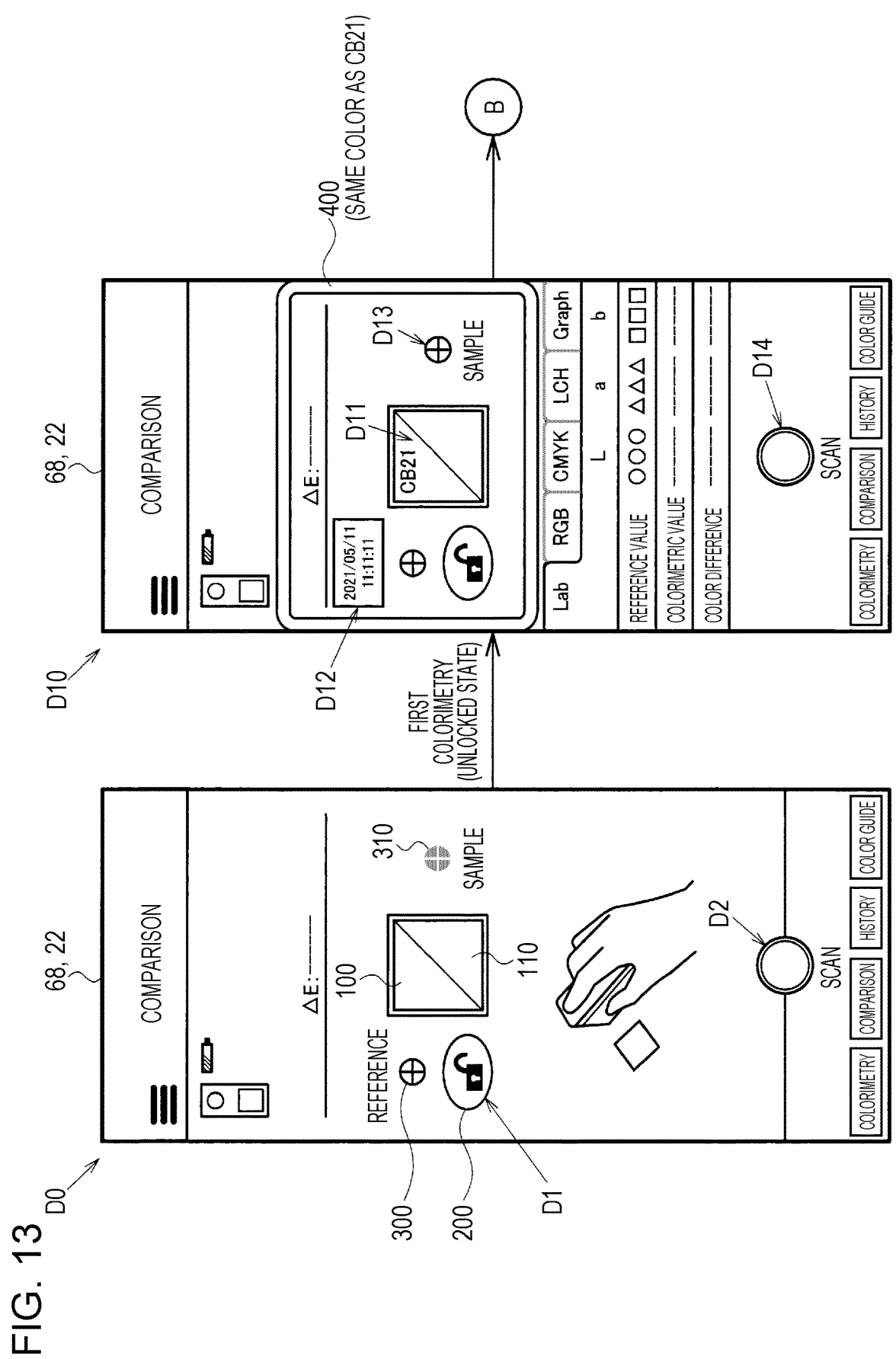
FIG. 13 is a diagram describing an example of screen transition when colorimetry is performed in the unlocked state.

When the user activates the predetermined application program of the terminal device 60, the display processing unit 19 displays a screen indicated by D0 in FIG. 13 on the display unit 68. As indicated by D1, on the screen indicated by D0, the lock button icon 200 in the mode indicating the unlocked state is displayed and other portions of the screen are the same as those of the screen indicated by C0 in FIG. 10.

When the user selects a button icon indicated by D2, the first colorimetry is performed and the screen indicated by D0 transitions to a screen indicated by D10. On the exemplary screen indicated by D10, the reference signs of the reference color region 100, the sample color region 110, the lock button icon 200, the first button icon 300, and the second button icon 310 are omitted. The same applies to an exemplary screen indicated by D20, an exemplary screen indicated by D30, and an exemplary screen indicated by D40. As indicated by D11, on the screen indicated by D10, the color CB21 of the guide 2-1 is set in the reference color region 100. In addition, as indicated by D12, information of the time when the colorimetry has been performed on the color CB21 is displayed. As indicated by D13, the second button icon 310 is displayed in the same mode as the first button icon 300. Therefore, the user can recognize that the second button icon 310 is enabled. In addition, the frame icon 400 is displayed in the same color as the color CB21 relating to the colorimetry performed last.

Figure 14:
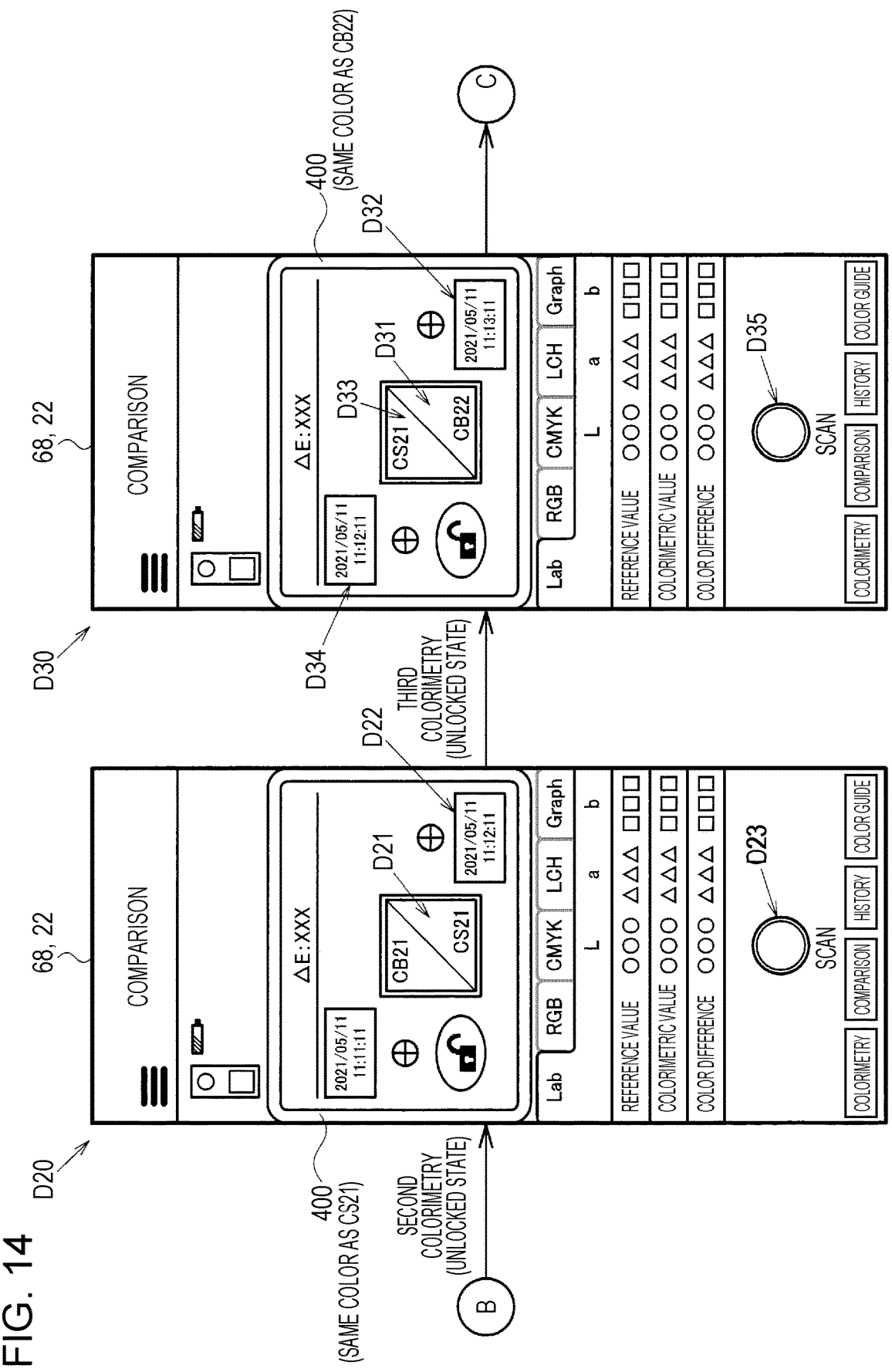
FIG. 14 is a diagram describing another example of the screen transition when the colorimetry is performed in the unlocked state.

When the user selects a button icon indicated by D14, the second colorimetry is performed and the screen indicated by D10 transitions to the screen indicated by D20 in FIG. 14. As indicated by D21, on the screen indicated by D20, the color CS21 of the sample 2-1 is set in the sample color region 110. In addition, as indicated by D22, information of the time when the colorimetry has been performed on the color CS21 is displayed. In addition, the frame icon 400 is displayed in the same color as the color CS21 relating to the colorimetry performed last.

When the user selects a button icon indicated by D23, the third colorimetry is performed and the screen indicated by D20 transitions to the screen indicated by D30. As indicated by D31, on the screen indicated by D30, the color CB22 of the guide 2-2 is set in the sample color region 110. In addition, as indicated by D32, information of the time when the colorimetry has been performed on the color CB22 is displayed. In addition, as indicated by D33, the color CS21 set in the sample color region 110 in the previous colorimetry is set in the reference color region 100. That is, in the colorimetric system 100 according to the embodiment, when the acquiring unit 15 acquires a new colorimetric value, the display processing unit 19 sets, as the reference color CB, the sample color CS set in the sample color region 110 in the reference color region 100 and performs the toggling display process of setting, as the reference color CB, the sample color CS set in the sample color region 110 in the reference color region 100 and setting the new colorimetric value in the sample color region 110. This enables the user to easily understand the transition of results of performing colorimetry in the unlocked state. Therefore, the colorimetric system 10 can provide the user with the user-friendly user interface. In addition, as indicated by D34, the displayed information of the time when the colorimetry has been performed on the color CB21 is changed to the displayed information of the time when the colorimetry has been performed on the color CS21. In addition, the frame icon 400 is displayed in the same color as the color CB22 relating to the colorimetry performed last.

Figure 15:
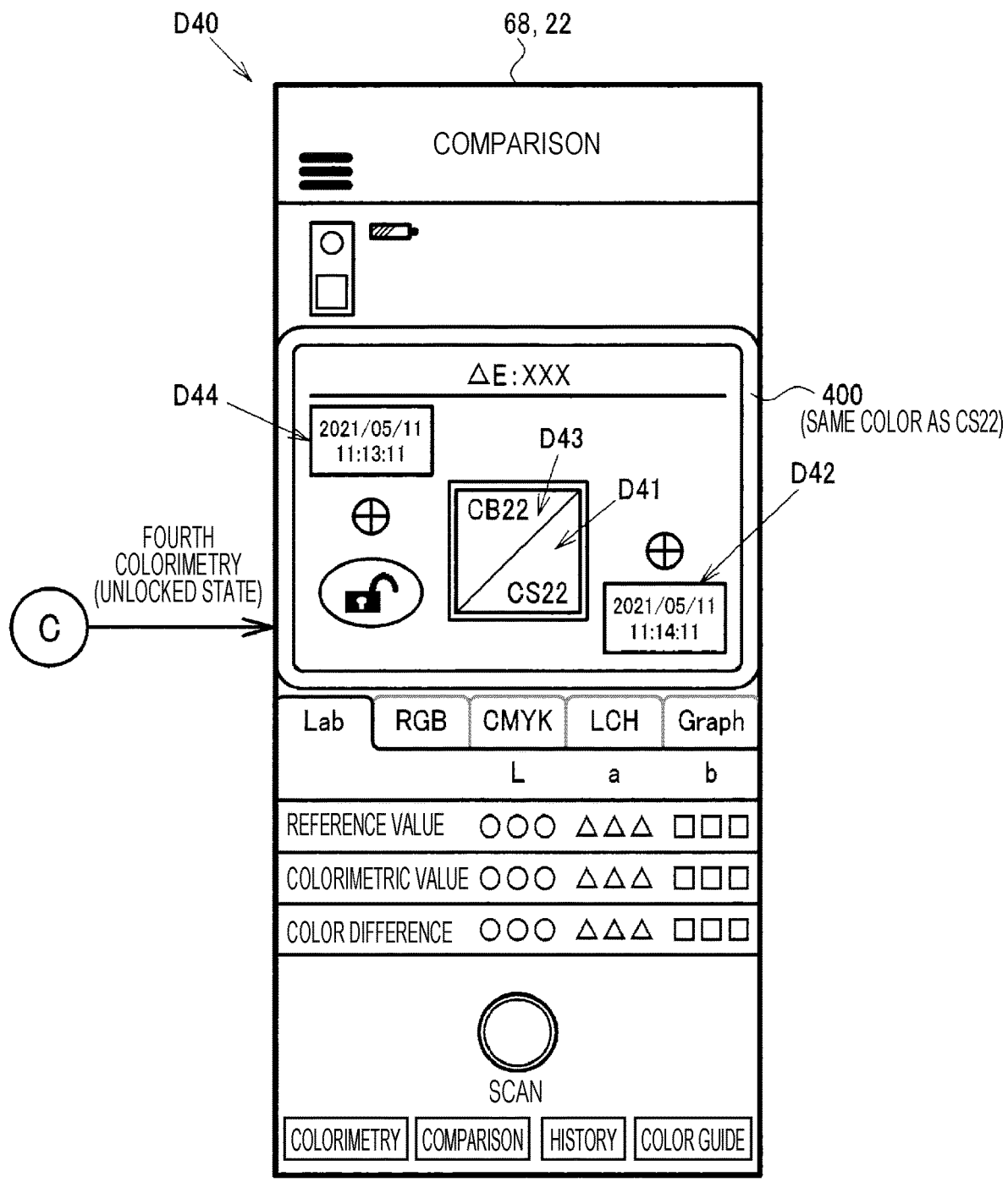
FIG. 15 is a diagram describing still another example of the screen transition when the colorimetry is performed in the unlocked state.

When the user selects a button icon indicated by D35, the fourth colorimetry is performed and the screen indicated by D30 transitions to the screen indicated by D40 in FIG. 15. As indicated by D41, on the screen indicated by D40, the color CS22 of the sample 2-2 is set in the sample color region 110. In addition, as indicated by D42, information of the time when the colorimetry has been performed on the color CS22 is displayed. In addition, as indicated by D43, the color CB22 set in the sample color region 110 in the previous colorimetry is set in the reference color region 100. In addition, as indicated by D44, the displayed information of the time when the colorimetry has been performed on the color CS21 is changed to the displayed information of the time when the colorimetry has been performed on the color CB22. In addition, the frame icon 400 is displayed in the same color as the color CS22 relating to the colorimetry performed last. Screens for the subsequent fifth and seventh colorimetry are the same as the above-described screen for the third colorimetry, screens for the subsequent sixth and eighth colorimetry are the same as the above-described screen for the fourth colorimetry, and descriptions thereof are omitted.

As described above, comparing the transition of the exemplary screens illustrated in FIGS. 10 and 11 with the transition of the exemplary screens illustrated in FIGS. 13 to 15, it is found that the above-described toggling display process is performed when the state of the reference color CB is the unlocked state and that the toggling display process is not performed when the state of the reference color CB is the locked state. That is, in the colorimetric system 100 according to the embodiment, the display processing unit 19 performs a process of displaying, on the display unit 22, the lock button icon 200 for setting the reference color CB of the reference color region 100 to the locked state or the unlocked state. In the locked state, the display processing unit 19 does not perform the toggling display process. In the unlocked state, the display processing unit 19 performs the toggling display process. Therefore, the user can clearly recognize that the state of the reference color CB is the unlocked state. For example, even when it is difficult to visually recognize the lock button icon 200 for a certain reason, the user can recognize that the state of the reference color CB is the unlocked state by repeating colorimetry and checking that the toggling display process is performed. Therefore, the colorimetric system 10 can provide the user with the user-friendly user interface.

When the user performs colorimetry in the second use case without setting the state of the reference color CB to the unlocked state, the reference color region 100 and the sample color region 110 are set to be blank after the end of the second colorimetry described with reference to FIG. 14, the user needs to perform a process of initializing the application program, and thus the workload of the user is heavy. On the other hand, when the user sets the state of the reference color CB to the unlocked state, results of the first, third, fifth, and seventh colorimetry are not necessary and the user can obtain a desired colorimetry result only by performing colorimetry on a guide and a sample alternately. That is, since the lock button icon 200 is displayed, the user can efficiently perform colorimetry in the second use case. In addition, when the lock button icon 200 and a comparison screen are combined, the user can perform colorimetry while checking the unlocked state. Therefore, the colorimetry system 10 can provide the user with the user-friendly user interface.

As described above, the embodiment relates to a colorimetric system that includes an acquiring unit that acquires a colorimetric value obtained by performing colorimetry by a colorimetric unit, a display processing unit that performs a process of displaying a comparison graphic obtained by combining a reference color graphic of a reference color region with a sample color graphic of a sample color region, and a comparison processing unit that compares a color value of a reference color set in the reference color region with a color value of a sample color set in the sample color region.

According to the embodiment, by using the comparison graphic obtained by combining the reference color graphic of the reference color region with the sample color graphic of the sample color region and performing colorimetry, it is possible to clearly visually recognize a change in the reference color of the reference color region and a change in the sample color of the sample color region and obtain a colorimetry result based on a color difference ΔE between the color value of the sample color and the color value of the reference color. Therefore, the user can perform colorimetry corresponding to various use cases. The colorimetric system can provide the user with a user interface corresponding to various use cases for colorimetry.

In addition, the display processing unit may perform a process of displaying, on a display unit, a lock button icon for setting the reference color of the reference color region to a locked state or an unlocked state.

This enables the user to arbitrarily switch the state of the reference color between the locked state and the unlocked state on a screen of the display unit.

In addition, when the acquiring unit acquires a new colorimetric value, the display processing unit may set, as the reference color, the sample color set in the sample color region in the reference color region and perform a toggling display process of setting the new colorimetric value in the sample color region.

This enables the user to easily understand the transition of results of performing colorimetry in the unlocked state.

In addition, the display processing unit may perform a process of displaying, on a display unit, a lock button icon for setting the reference color of the reference color region to a locked state or an unlocked state, may not perform the toggling display process in the locked state, and may perform the toggling display process in the unlocked state.

This enables the user to clearly recognize that the state of the reference color is the unlocked state.

In addition, the display processing unit may perform a process of displaying a first button icon for setting the reference color at a position corresponding to the reference color region and displaying a second button icon for setting the sample color at a position corresponding to the sample color region.

This enables the user to easily switch between a setting for setting the reference color and a setting for setting the sample color.

In addition, when the reference color is not set in the reference color region and the sample color is not set in the sample color region, the display processing unit may perform a display process of disabling the second button icon.

This enables the user to prevent the sample color from being set in the sample color region in a state in which the reference color is not set in the reference color region.

In addition, when the reference color is not set in the reference color region and the sample color is not set in the sample color region, the display processing unit may perform a display process of graying out the second button icon.

This enables the user to recognize that the second button icon is disabled.

In addition, when the first button icon is selected, the display processing unit may perform a process of displaying a first selection menu screen for selecting the reference color to be set in the reference color region, and when the second button icon is selected, the display processing unit may perform a process of displaying a second selection menu screen for selecting the sample color to be set in the sample color region.

This enables the user to set the reference color and the sample color in detail.

In addition, the display processing unit may perform a process of displaying, as the reference color, a color selected based on at least one of a color guide, the colorimetric value, a color history value, and a reference color group on the first selection menu screen and perform a process of displaying, as the sample color, a color selected based on at least one of the color guide, the colorimetric value, and the color history value on the second selection menu screen.

This enables the user to acquire the reference color and the sample color by various methods.

In addition, the display processing unit may perform a process of displaying, on a display unit, a frame icon that is based on the colorimetric value obtained by performing the colorimetry last by the colorimetric unit and surrounds the comparison graphic.

This enables the user to recognize a color subjected to colorimetry last.

In addition, the embodiment relates to a colorimetric method including acquiring a colorimetric value obtained by performing colorimetry by a colorimetric unit, performing a process of displaying a comparison graphic obtained by combining a reference color graphic of a reference color region with a sample color graphic of a sample color region, and comparing a color value of a reference color set in the reference color region with a color value of a sample color set in the sample color region.

In addition, the embodiment relates to a non-transitory computer-readable storage medium storing a program including causing a colorimetric system to acquire a colorimetric value obtained by performing colorimetry by a colorimetric unit, causing the colorimetric system to perform a process of displaying a comparison graphic obtained by combining a reference color graphic of a reference color region with a sample color graphic of a sample color region, and causing the colorimetric system to compare a color value of a reference color set in the reference color region with a color value of a sample color set in the sample color region.

Although the embodiment is described above in detail, persons skilled in the art would be able to easily understand that many modifications that do not substantially deviate from the novelties and effects of the embodiment are possible. Therefore, all the modifications are included in the scope of the present disclosure. For example, a term that has been described at least once together with a different term that is broader or synonymous in the present specification or the drawings can be replaced with the different term anywhere in the present specification or the drawings. In addition, all combinations of the embodiment and the modifications are included in the scope of the present disclosure. Furthermore, the configurations and operations of the colorimetric system, the colorimetric method, the program, and the like are not limited to those described in the embodiment and can be variously modified.

What is claimed is:

1. A colorimetric system comprising:
a processor;
a non-transitory hardware storage device that has stored thereon computer executable code that when executed by the processor, cause the colorimetric system to implement;
an acquiring unit that acquires a colorimetric value obtained by performing colorimetry by a colorimetric unit;
a display processing unit that performs a display process of displaying a comparison graphic obtained by combining a reference color graphic of a reference color regio with a sample color graphic of a sample color region; and
a comparison processing unit that compares a color value of a reference color set in the reference color region with a color value of a sample color set in the sample color region,
wherein the display processing unit performs a process of displaying, on a display unit, a lock button icon for setting the reference color of the reference color region to a locked state or an unlocked state.

2. A colorimetric system comprising:
a processor;
a non-transitory hardware storage device that has stored thereon computer executable code that when executed by the processor, cause the colorimetric system to implement;
an acquiring unit that acquires a colorimetric value obtained by performing colorimetry by a colorimetric unit;
a display processing unit that performs a display process of displaying a comparison graphic obtained by combining a reference color graphic of a reference color regio with a sample color graphic of a sample color region; and
a comparison processing unit that compares a color value of a reference color set in the reference color region with a color value of a sample color set in the sample color region,
wherein when the acquiring unit acquires a new colorimetric value, the display processing unit sets, as the reference color, the sample color set in the sample color region in the reference color region and performs a toggling display process of setting the new colorimetric value in the sample color region.

3. The colorimetric system according to claim 2, wherein
the display processing unit performs a process of displaying, on a display unit, a lock button icon for setting the reference color of the reference color region to a locked state or an unlocked state,
the display processing unit does not perform the toggling display process in the locked state, and the display processing unit performs the toggling display process in the unlocked state.

4. A colorimetric system comprising:

a processor;

a non-transitory hardware storage device that has stored thereon computer executable code that when executed by the processor, cause the colorimetric system to implement;

an acquiring unit that acquires a colorimetric value obtained by performing colorimetry by a colorimetric unit;

a display processing unit that performs a display process of displaying a comparison graphic obtained by combining a reference color graphic of a reference color regio with a sample color graphic of a sample color region; and a comparison processing unit that compares a color value of a reference color set in the reference color region with a color value of a sample color set in the sample color region, wherein the display processing unit performs a process of displaying a first button icon for setting the reference color at a position corresponding to the reference color region and displaying a second button icon for setting the sample color at a position corresponding to the sample color region.

5. The colorimetric system according to claim 4, wherein when the reference color is not set in the reference color region and the sample color is not set in the sample color region, the display processing unit performs a display process of disabling the second button icon.

6. The colorimetric system according to claim 5, wherein when the reference color is not set in the reference color region and the sample color is not set in the sample color region, the display processing unit performs a display process of graying out the second button icon.

7. The colorimetric system according to claim 4, wherein when the first button icon is selected, the display processing unit performs a process of displaying a first selection menu screen for selecting the reference color to be set in the reference color region, and when the second button icon is selected, the display processing unit performs a process of displaying a second selection menu screen for selecting the sample color to be set in the sample color region.

8. The colorimetric system according to claim 7, wherein the display processing unit performs a process of displaying, as the reference color, a color selected based on at least one of a color guide, the colorimetric value, a color history value, and a reference color group on the first selection menu screen, and the display processing unit performs a process of displaying, as the sample color, a color selected based on at least one of the color guide, the colorimetric value, and the color history value on the second selection menu screen.

9. A colorimetric system comprising:

a processor;

a non-transitory hardware storage device that has stored thereon computer executable code that when executed by the processor, cause the colorimetric system to implement;

an acquiring unit that acquires a colorimetric value obtained by performing colorimetry by a colorimetric unit;

a display processing unit that performs a display process of displaying a comparison graphic obtained by combining a reference color graphic of a reference color regio with a sample color graphic of a sample color region; and a comparison processing unit that compares a color value of a reference color set in the reference color region with a color value of a sample color set in the sample color region, wherein the display processing unit performs a process of displaying, on a display unit, a frame icon that is based on the colorimetric value obtained by performing the colorimetry last by the colorimetric unit and surrounds the comparison graphic.

* * * * *